(12) United States Patent
Han et al.

(10) Patent No.: US 11,086,434 B2
(45) Date of Patent: Aug. 10, 2021

(54) TOUCH SENSING UNIT HAVING FORCE SENSOR AND DISPLAY DEVICE INCLUDING THE TOUCH SENSING UNIT

(71) Applicant: Samsung Display Co., Ltd., Yongin-si (KR)

(72) Inventors: Hye Yun Han, Hwaseong-si (KR); Eun Young Kim, Asan-si (KR); Gyeong Nam Bang, Seoul (KR); Chang Ho Lee, Busan (KR); Chung Yi, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/688,887

(22) Filed: Nov. 19, 2019

(65) Prior Publication Data

US 2020/0310580 A1    Oct. 1, 2020

(30) Foreign Application Priority Data

Apr. 1, 2019    (KR) .................. 10-2019-0037680

(51) Int. Cl.
*G06F 3/041*    (2006.01)
*G06F 3/044*    (2006.01)

(52) U.S. Cl.
CPC .......... *G06F 3/0414* (2013.01); *G06F 3/0443* (2019.05)

(58) Field of Classification Search
CPC .... G06F 3/0443; G06F 3/0446; G06F 3/0414; G06F 2203/04105; G06F 2203/04112
See application file for complete search history.

(56) References Cited

U.S. PATENT DOCUMENTS

| | | | |
|---|---|---|---|
| 2003/0159910 A1 | 8/2003 | Caldwell | |
| 2010/0214247 A1* | 8/2010 | Tang | ............ G06F 3/0443 345/173 |
| 2012/0050222 A1 | 3/2012 | Magami et al. | |
| 2013/0009905 A1 | 1/2013 | Castillo et al. | |
| 2013/0181943 A1 | 7/2013 | Bulea et al. | |
| | (Continued) | | |

FOREIGN PATENT DOCUMENTS

| | | |
|---|---|---|
| CN | 107621908 A | 1/2018 |
| EP | 3647919 A2 | 5/2020 |
| | (Continued) | |

OTHER PUBLICATIONS

EPO Extended Search Report dated Jun. 25, 2020, for corresponding European Patent Application No. 20162945.8 (15 pages).

*Primary Examiner* — Abbas I Abdulselam
(74) *Attorney, Agent, or Firm* — Lewis Roca Rothgerber Christie LLP

(57) ABSTRACT

A touch sensor includes touch electrodes in a first area and a second area, a first force sensor electrode on a same layer as the touch electrodes and spaced from a first touch electrode in the first area, a first force sensor line on a same layer as the touch electrodes and electrically connected to the first force sensor electrode, the first force sensor line being at a second side of the first touch electrode, and touch lines on a same layer as, and connected to, the touch electrodes, the touch lines including a first touch line connected to the first touch electrode and at a first side of the first touch electrode.

25 Claims, 25 Drawing Sheets

(56) References Cited

U.S. PATENT DOCUMENTS

| | | | |
|---|---|---|---|
| 2013/0285970 A1* | 10/2013 | Ahn | G06F 3/0447 |
| | | | 345/173 |
| 2014/0168138 A1* | 6/2014 | Kuo | G06F 3/0443 |
| | | | 345/174 |
| 2014/0333555 A1 | 11/2014 | Oh et al. | |
| 2017/0068368 A1 | 3/2017 | Hsiao et al. | |
| 2017/0192565 A1 | 7/2017 | Pan et al. | |
| 2017/0364194 A1 | 12/2017 | Jang et al. | |
| 2018/0081466 A1 | 3/2018 | Moon | |
| 2018/0218859 A1* | 8/2018 | Ligtenberg | G06F 3/04144 |
| 2019/0121484 A1* | 4/2019 | Zhang | G06F 3/044 |
| 2019/0267431 A1* | 8/2019 | Yang | G06F 3/0412 |
| 2020/0117305 A1 | 4/2020 | Kim et al. | |
| 2020/0142539 A1 | 5/2020 | Kim et al. | |

FOREIGN PATENT DOCUMENTS

| | | |
|---|---|---|
| EP | 3651005 A1 | 5/2020 |
| JP | 2013-228855 A | 11/2013 |
| JP | 2016-76136 A | 5/2016 |
| KR | 10-2014-0117525 A | 10/2014 |
| KR | 10-1449499 B1 | 10/2014 |
| KR | 10-2016-0017230 A | 2/2016 |
| WO | 03/044956 A2 | 5/2003 |
| WO | 2013/005861 A1 | 1/2013 |

\* cited by examiner

TOUCH SENSING UNIT HAVING FORCE SENSOR AND DISPLAY DEVICE INCLUDING THE TOUCH SENSING UNIT

CROSS-REFERENCE TO RELATED APPLICATION

This application claims priority to and the benefit of Korean Patent Application No. 10-2019-0037680, filed on Apr. 1, 2019 in the Korean Intellectual Property Office, the entire content of which is incorporated herein by reference.

BACKGROUND

1. Field

Aspects of the present disclosure relate to a touch sensing unit having a force sensor and a display device including the touch sensing unit.

2. Description of the Related Art

An electronic device capable of providing an image, such as a smartphone, a tablet personal computer (PC), a digital camera, a notebook computer, a navigation device, or a television (TV), includes a display device for displaying an image. The display device includes a display panel for generating and displaying an image and various input devices.

Touch sensing units capable of detecting touch input have increasingly been employed in small-size electronic devices such as smartphones or tablet PCs as input devices. The touch sensing unit detects touch input from a user and returns the location of the touch input as touch input coordinates. Also, force sensors capable of detecting force applied by a user have been employed in the small-size electronic device as input devices.

SUMMARY

Aspects of example embodiments of the present disclosure are directed to a touch sensing unit (e.g., touch sensor) that has a force sensor and can thus reduce cost.

Aspects of example embodiments of the present disclosure are also directed to a display device including a touch sensing unit (e.g., touch sensor) that has a force sensor and can thus reduce cost.

However, example embodiments of the present disclosure are not restricted to those set forth herein. The above and other example embodiments of the present disclosure will become more apparent to one of ordinary skill in the art to which the present disclosure pertains by referencing the detailed description of the present disclosure given below.

According to some example embodiments of the present disclosure, there is provided a touch sensor including: touch electrodes in a first area and a second area; a first force sensor electrode on a same layer as the touch electrodes and spaced from a first touch electrode in the first area; a first force sensor line on a same layer as the touch electrodes and electrically connected to the first force sensor electrode, the first force sensor line being at a second side of the first touch electrode; and touch lines on a same layer as, and connected to, the touch electrodes, the touch lines including a first touch line connected to the first touch electrode and at a first side of the first touch electrode.

In some embodiments, the first touch electrode surrounds the first force sensor electrode.

In some embodiments, the touch sensor further includes a first connecting line on a same layer as the touch electrodes, connecting the first force sensor line and the first force sensor electrode, and spaced from the first touch electrode.

In some embodiments, the first force sensor electrode includes a first sub force sensor electrode and a second sub force sensor electrode on a same layer as the touch electrodes, electrically connected to the first force sensor line, and spaced from the first touch electrode.

In some embodiments, the first touch electrode surrounds the first and second sub force sensor electrodes.

In some embodiments, the touch sensor further includes a first connecting line on a same layer as the touch electrodes, connecting the first force sensor line and the first sub force sensor electrode, and spaced from the first touch electrode.

In some embodiments, the touch sensor further includes a second connecting line on a same layer as the touch electrodes, connecting the first force sensor electrode and the second sub force sensor electrode, and spaced from the first touch electrode.

In some embodiments, the touch sensor further includes a second force sensor line on a same layer as the touch electrodes and electrically connected to the first force sensor electrode, wherein the first force sensor line is electrically connected to a first end of the first sub force sensor electrode, and wherein the second force sensor line is electrically connected to a second end of the second sub force sensor electrode.

In some embodiments, the touch sensor further includes: a first connecting line on a same layer as the touch electrodes and connecting the first force sensor line and the first sub force sensor electrode; and a second connecting line on a same layer as the touch electrodes and connecting the second force sensor line and the second force sensor electrode.

In some embodiments, the first and second connecting lines are spaced from the first touch electrode.

In some embodiments, the touch sensor further includes a second force sensor line on a same layer as the touch electrodes and electrically connected to the second sub force sensor electrode.

In some embodiments, the touch sensor further includes: a first connecting line on a same layer as the touch electrodes and connecting the first force sensor line and the first sub force sensor electrode; a second connecting line on a same layer as the touch electrodes and connecting the second force sensor line and the second sub force sensor electrode; and a third connecting line on a same layer as the touch electrodes and connecting the first and second sub force sensor electrodes.

In some embodiments, the first, second, and third connecting lines are spaced from the first touch electrode.

In some embodiments, the touch electrodes include driving electrodes and sensing electrodes, and the touch sensor further includes a touch driving signal output part configured to apply touch driving signals to the driving electrodes and a touch sensing part configured to detect variations in mutual capacitance between the driving electrodes and the sensing electrodes.

In some embodiments, the touch sensor further includes a second force sensor electrode on a same layer as the touch electrodes and spaced from a second touch electrode in the first area.

In some embodiments, the second force sensor electrode is electrically connected to the first force sensor line.

In some embodiments, the touch lines further include a second touch line connected to the second touch electrode and on a first side of the second touch electrode, and the first force sensor line is on a second side of the second touch electrode.

In some embodiments, the touch sensor further includes a first dummy electrode on a same layer as the touch electrodes and spaced from a third touch electrode in the first area.

In some embodiments, the third touch electrode surrounds the first dummy electrode.

In some embodiments, the first dummy electrode is electrically floated.

In some embodiments, the touch sensor further includes a second dummy electrode on a same layer as the touch electrodes and spaced from a fourth touch electrode in the second area.

In some embodiments, the fourth touch electrode surrounds the second dummy electrode.

In some embodiments, the second dummy electrode is electrically floated.

In some embodiments, the touch sensor further includes: a force driving signal output part configured to apply a force driving signal to the first force sensor electrode via the first force sensor line; and a force sensing part configured to detect a variation in a self-capacitance of the first force sensor electrode via the first force sensor line.

In some embodiments, the touch sensor further includes a force sensing part electrically connected to the first and second force sensor lines, wherein the force sensing part includes a first output node, a second output node, a first node to which a driving voltage is applied, and a second node which is connected to a ground source, wherein the first force sensor line is electrically connected to the first node, and wherein the second force sensor line is electrically connected to the first output node.

According to some embodiments of the present invention, there is provided a display device including: a substrate; a display unit on the substrate and including a display area which includes pixels; and a touch sensor on the display unit and including a touch sensor area which overlaps with the display area, the touch sensor including: touch electrodes in a first area and a second area of the touch sensor area; a first force sensor electrode on a same layer as the touch electrodes and spaced from a first touch electrode in the first area; and a first force sensor line on a same layer as the touch electrodes and electrically connected to the first force sensor electrode, the first force sensor line being at a second side of the first touch electrode; and touch lines on a same layer as, and connected to, the touch electrodes, the touch lines including a first touch line connected to the first touch electrode and on a first side of the first touch electrode.

According to the aforementioned and other example embodiments of the present disclosure, by forming force sensor electrodes, instead of dummy electrodes, in a force sensing area, a touch sensing unit capable of detecting not only touch input, but also pressure input from a user, can be provided. That is, since the touch sensing unit can detect pressure from the user due to the force sensor electrodes, an additional force sensor is not needed, and the manufacturing cost of the touch sensing unit can be reduced accordingly.

Other features and example embodiments may be apparent from the following detailed description, the drawings, and the claims.

BRIEF DESCRIPTION OF THE DRAWINGS

The above and other example embodiments and features of the present disclosure will become more apparent by describing in detail example embodiments thereof with reference to the attached drawings, in which.

DETAILED DESCRIPTION

The present disclosure will now be described more fully hereinafter with reference to the accompanying drawings, in which example embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art. The same reference numbers indicate the same components throughout the specification. In the attached figures, the thickness of layers and regions is exaggerated for clarity.

Hereinafter, embodiments of the present disclosure will be described with reference to the attached drawings.

Figure 1:
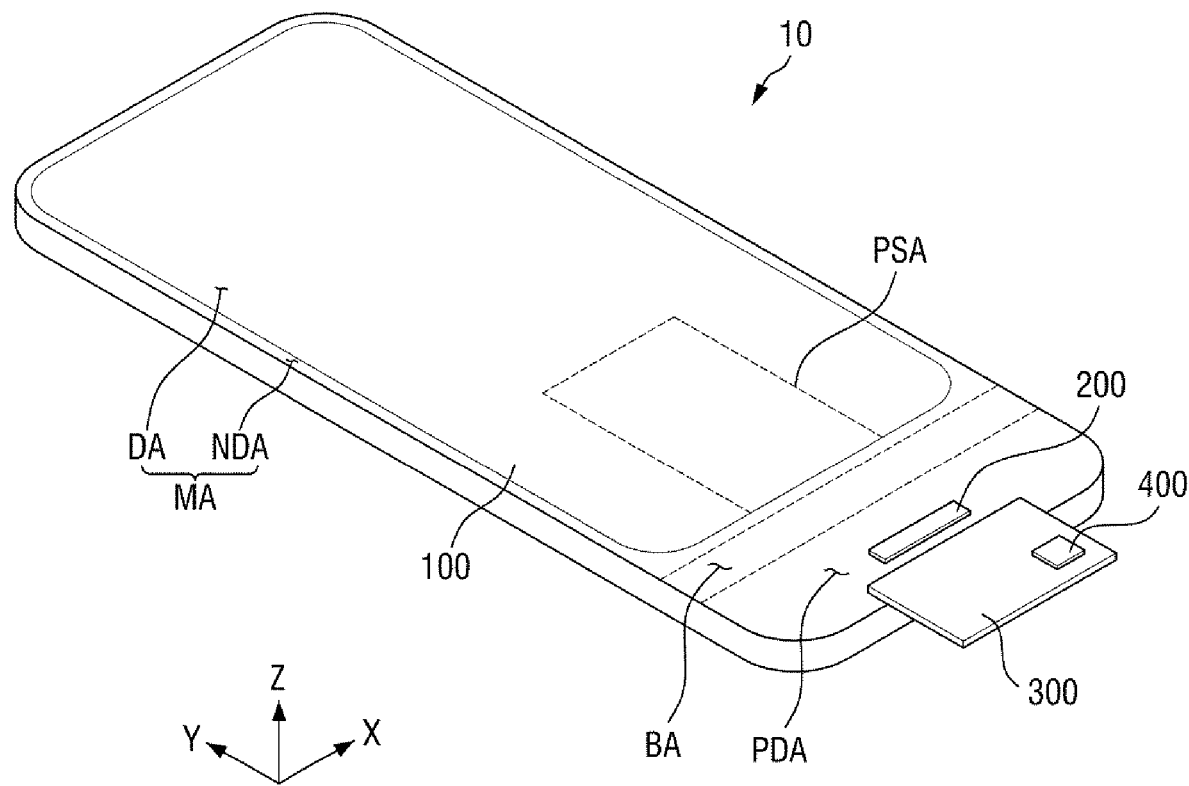
FIG. 1 is a perspective view of a display device according to an embodiment of the present disclosure.
Figure 2:
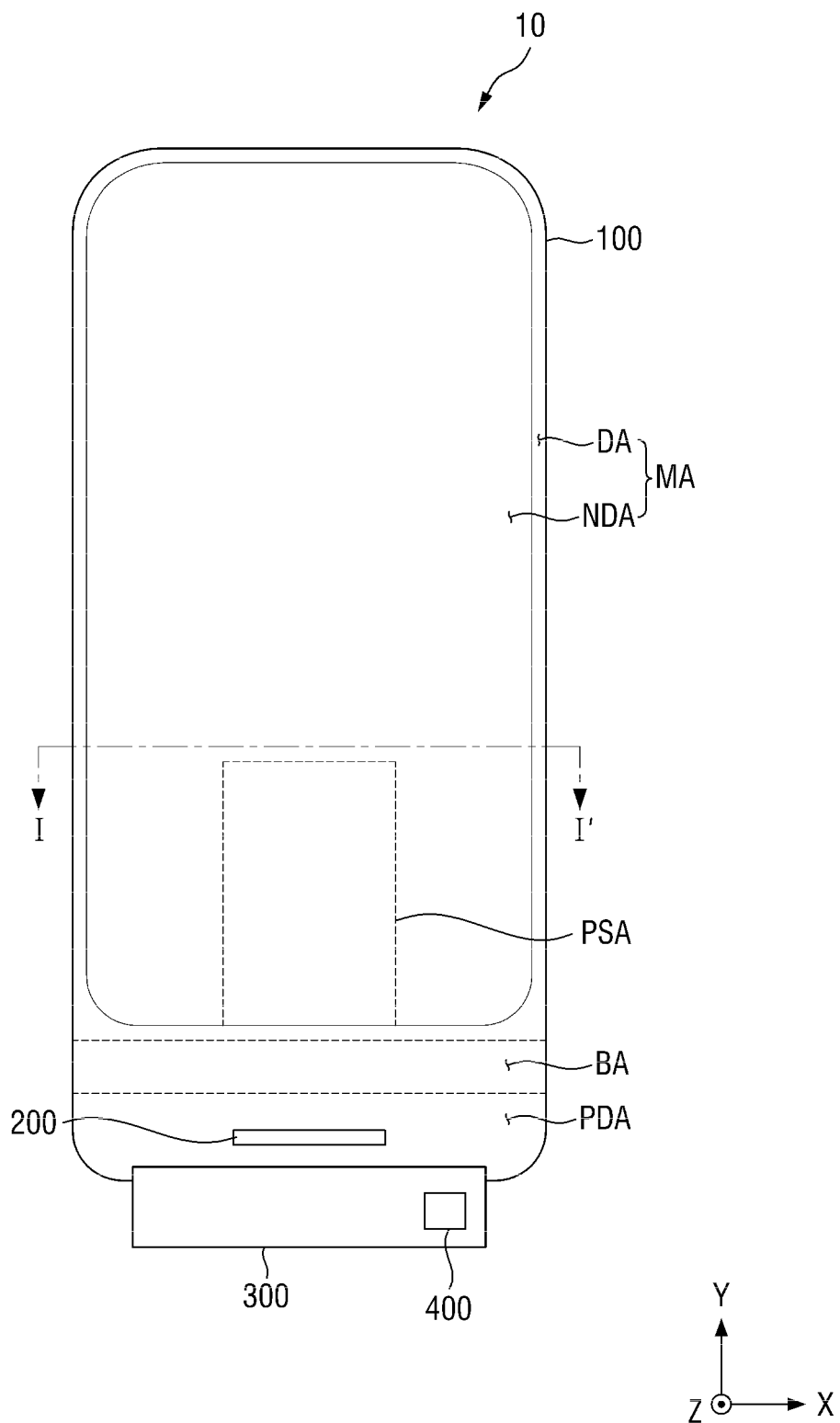
FIG. 2 is a plan view of the display device of FIG. 1.
Figure 3:
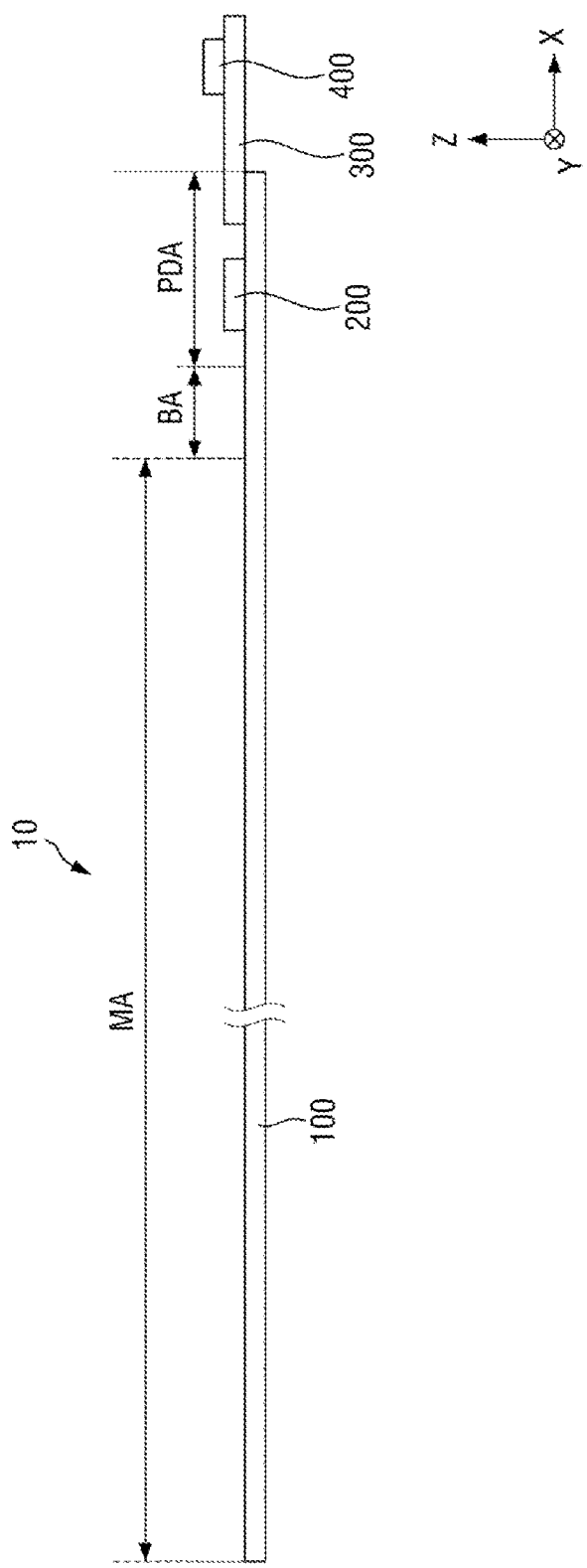
FIGS. 3-4 are side views of the display device of FIG. 1.
Figure 4:
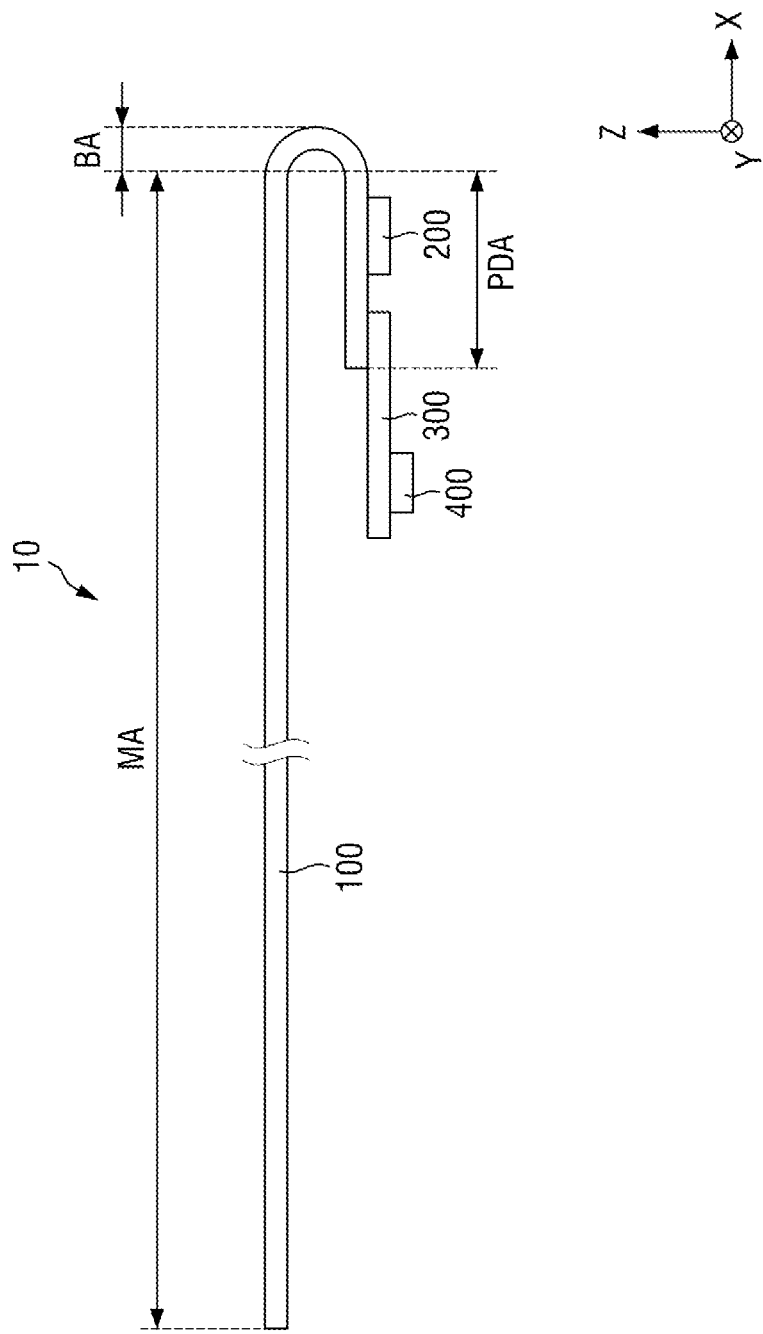

FIG. 1 is a perspective view of a display device according to an exemplary embodiment of the present disclosure. FIG. 2 is a plan view of the display device of FIG. 1. FIGS. 3 and 4 are side views of the display device of FIG. 1.

The terms "above", "top", and "top surface", as used herein, denote an upper direction from a display panel 100, that is, a Z-axis direction, and the terms "below", "bottom", and "bottom surface", as used herein, denote a downward direction from the display panel 100, that is, a direction opposite to the Z-axis direction. Also, the terms "left", "right", "upper", and "lower", as used herein, denote their respective directions when the display panel 100 is viewed from thereabove. For example, the term "left" refers to a direction opposite to an X-axis direction, the term "right" refers to the X-axis direction, the term "upper" refers to a Y-axis direction, and the term "lower" refers to a direction opposite to the Y-axis direction.

Referring to FIGS. 1 through 4, a display device 10, which is a device for displaying a moving image or a still image, may be used not only in a portable electronic device such as a mobile phone, a smartphone, a tablet personal computer (PC), a smart watch, a watch phone, a mobile communication terminal, an electronic notebook, an electronic book, a portable multimedia player (PMP), a navigation device, or an ultra-mobile PC (UMPC), but also in various other products such as a television (TV), a notebook computer, a monitor, a billboard, or an Internet-of-Things (IoT) device. The display device 10 may be one of an organic light-emitting diode (OLED) display device, a liquid crystal display (LCD) device, a plasma display device, a field emission display (FED) device, an electrophoretic display (EPD) device, an electrowetting display device, a quantum dot light-emitting diode (QLED) display device, and a micro light-emitting diode (mLED) display device. The display device 10 will hereinafter be described as being an OLED display device, but the present disclosure is not limited thereto.

The display device 10 includes the display panel 100, a display driving circuit 200, a circuit board 300, and a touch driving circuit 400.

The display panel 100 may include a main area MA, a bending area BA and a pad area PDA which are disposed on one side of the main area MA. The pad area PDA may be disposed on one side of the bending area BA, and the main area MA may be disposed on the other side of the bending area BA. The bending area BA may be disposed between the main area MA and the pad area PDA. The pad area PDA may be disposed on one side of the display panel 100.

FIGS. 1 and 2 illustrate that the length, in a first direction (e.g., the X-axis direction), of the bending area BA is substantially the same as the length, in the first direction (e.g., the X-axis direction), of the main area MA, but the present disclosure is not limited thereto. In some examples, the lengths, in the first direction (e.g., the X-axis direction), of the bending area BA and the pad area PDA may be smaller than the length, in the first direction (e.g., the X-axis direction), of the main area MA.

The main area MA may have a rectangular plane shape having a pair of short sides extending in a first direction (e.g., the X-axis direction) and a pair of long sides extending in a second direction (e.g., the Y-axis direction), which intersects the first direction (e.g., the X-axis direction). The corners where the short sides and the long sides of the main area MA meet may be rounded to have a set or predetermined curvature or may be right-angled. The shape of the display device 10 is not limited to a rectangular shape, and the display device 10 may be formed in various other polygonal shapes or in a circular or elliptical shape. The main area MA may be flat, but the present disclosure is not limited thereto. In some examples, the main area MA may include curved parts formed at left and right ends thereof, in which case, the curved parts may have a uniform curvature or a variable curvature.

The main area MA may include a display area DA in which pixels are formed to display an image and a non-display area NDA which is on the periphery of the display area DA.

In the display area DA, not only the pixels, but also scan lines, data lines, and power lines connected to the pixels, may be provided. In a case where the main area MA includes curved parts, the display area DA may also be provided on the curved parts of the main area MA. In this case, an image displayed by the display panel 100 can be viewed on the curved parts of the main area MA.

The non-display area NDA may be defined as ranging from the edges of the display area DA to the edges of the display panel 100. In the non-display area NDA, a scan driver 110 for applying scan signals to the scan lines and fan-out lines FL for connecting the data lines and the display driving circuit 200 may be disposed.

The display panel 100 may be flexible and may thus be bendable, foldable, or rollable. Accordingly, the display panel 100 can be bent in the bending area BA in a thickness direction (e.g., the Z-axis direction). When the display panel 100 is yet to be bent, the pad area PDA of the display panel 100 faces upward, as illustrated in FIG. 3. Once the display panel 100 is bent, the pad area PDA of the display panel 100 may face downward, as illustrated in FIG. 4. As a result, as illustrated in FIG. 4, the pad area PDA may be disposed below the main area MA and may thus overlap with the main area MA.

In the pad area PDA of the display panel 100, pads electrically connected to the display driving circuit 200 and the circuit board 300 may be disposed.

The display driving circuit 200 may output signals and voltages for driving the display panel 100. For example, the display driving circuit 200 may provide data voltages to the data lines. Also, the display driving circuit 200 may provide power voltages to the power lines and may provide scan control signals to the scan driver 110. The display driving circuit 200 may be formed as an integrated circuit (IC) and may be mounted on the display panel 100 in the pad area PDA in a chip-on-glass (COG), chip-on-plastic (COP), or ultrasonic bonding manner, but the present disclosure is not limited thereto. For example, the display driving circuit 200 may be mounted on the circuit board 300.

Figure 23:
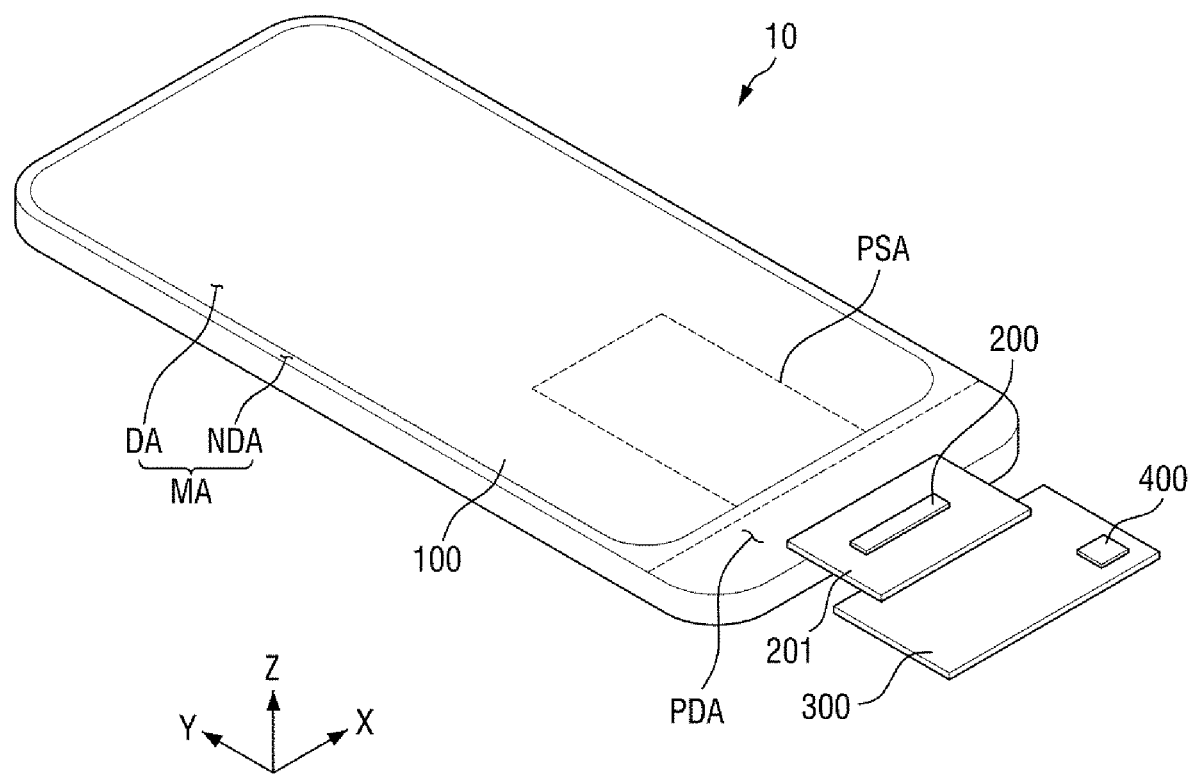
FIG. 23 is a perspective view of a display device according to another embodiment of the present disclosure.

In some examples, the display driving circuit 200 may be disposed on a flexible film 201 such as a chip-on-film (COF) attached to one side of the display panel 100, as illustrated in FIG. 23. In this case, one side of the flexible film 201 may be attached to display pads DP and touch pads (TP1 and TP2) disposed on one side of the display panel 100, and the other side of the flexible film 201 may be attached to one side of the circuit board 300.

Figure 5:
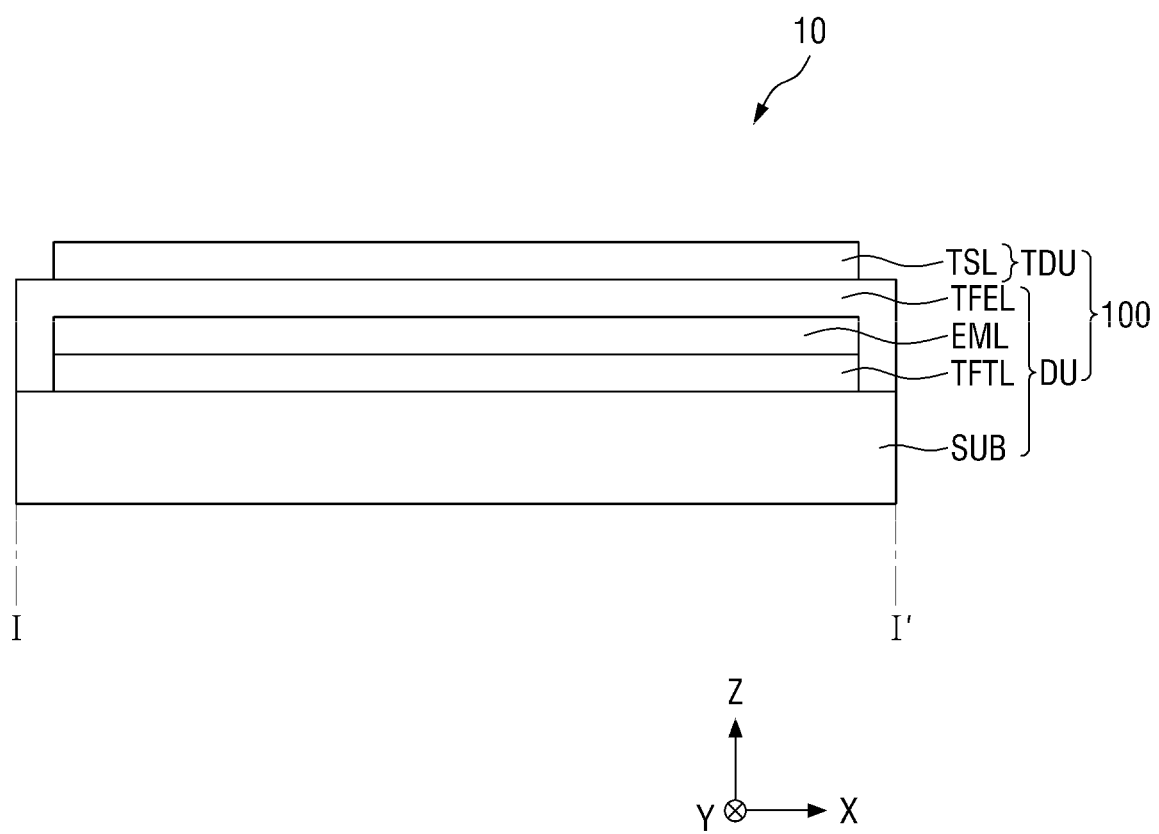
FIG. 5 is a cross-sectional view taken along the line I-I' of FIG. 2.
Figure 6:
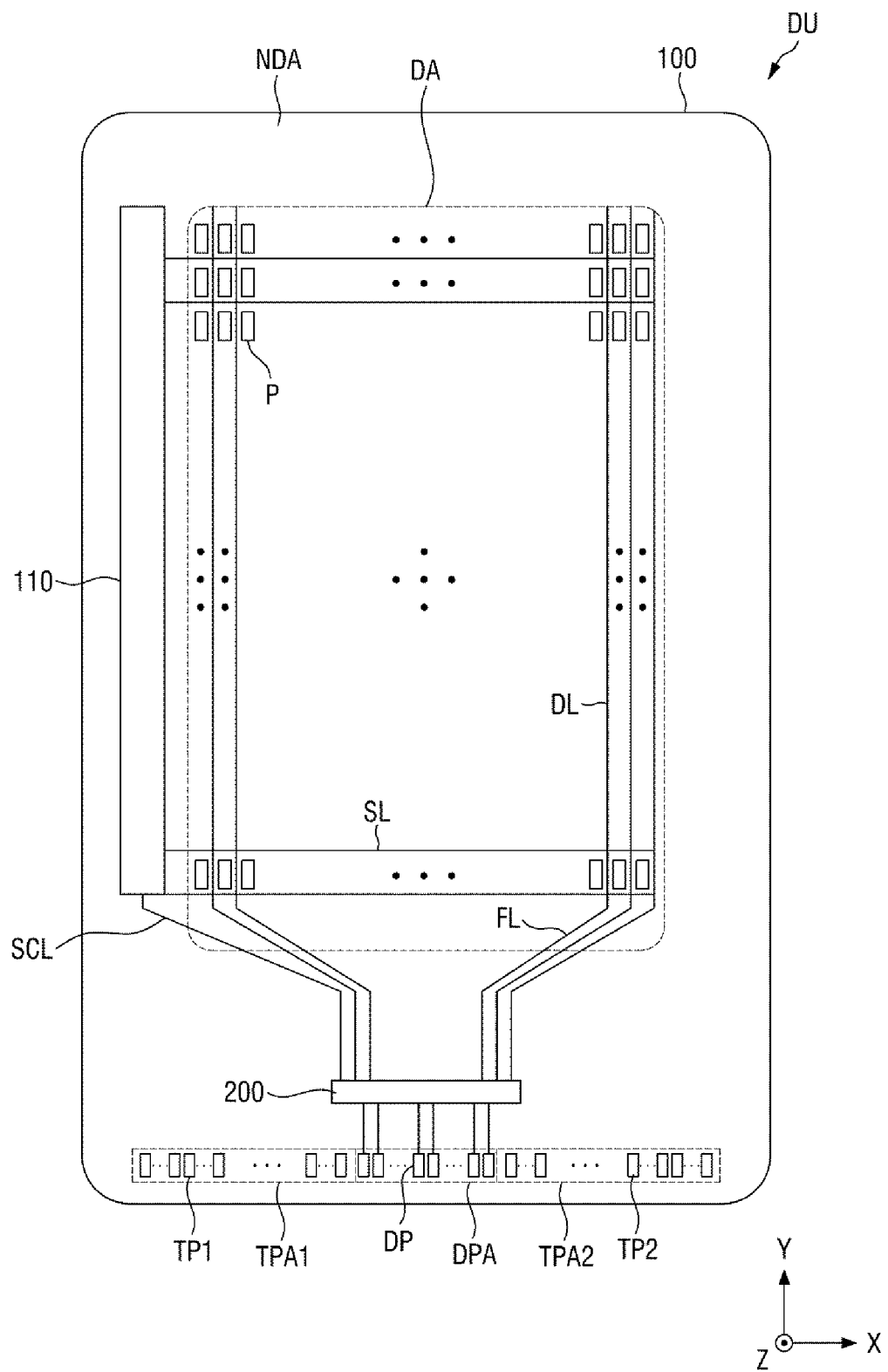
FIG. 6 is a plan view illustrating elements associated with the display unit of FIG. 5.

Referring to FIGS. 5 and 6, the pads of the pad area PDA may include the display pads DP, which are electrically connected to the display driving circuit 200, and the touch pads (TP1 and TP2), which are electrically connected to touch lines.

The circuit board 300 may be attached to the pads via an anisotropic conductive film. As a result, the lead lines of the circuit board 300 may be electrically connected to the pads. The circuit board 300 may be a flexible film such as a flexible printed circuit board, a printed circuit board, or a chip-on-film.

The touch driving circuit 400 may be connected to touch electrodes of the touch sensing unit (e.g., touch sensor) of the display panel 100. The touch driving circuit 400 applies a driving signal to the touch electrodes and measures a voltage charged to the mutual capacitance of the touch electrodes. The driving signal may be a signal having multiple driving pulses. The touch driving circuit 400 not only can determine the presence of touch input based on the mutual capacitance of the touch electrodes, but also can calculate the touch coordinates of touch input.

The touch driving circuit 400 may be connected to force sensor electrodes disposed in a force sensing area PSA. The touch driving circuit 400 may detect the pressure applied to the force sensing area PSA by the user by measuring the self-capacitance of the force sensor electrodes or using the force sensor electrodes as strain gauges. FIG. 1 illustrates that the force sensing area PSA is provided in the middle of a lower part of the display area DA, but the location of the force sensing area PSA is not particularly limited.

The touch driving circuit 400 may be disposed on the circuit board 300. The touch driving circuit 400 may be formed as an IC and may be mounted on the circuit board 300.

FIG. 5 is a cross-sectional view taken along the line I-I' of FIG. 2.

Referring to FIG. 5, the display panel 100 may include a substrate SUB, a display unit DU, which is disposed on the substrate SUB and includes a TFT layer TFTL, a light-emitting element layer EML, and a thin-film encapsulation layer TFEL, and a touch sensing unit (e.g., touch sensor) TDU, which includes a touch sensor layer TSL.

The substrate SUB may be a rigid substrate or a flexible substrate that is material such as glass, quartz, a polymer resin. The polymer material may be polyethersulfone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof. In some examples, the substrate SUB may include a metallic material.

The TFT layer TFTL may be disposed on the substrate SUB. In the TFT layer TFTL, not only the TFTs of the pixels, but also the scan lines, the data lines, the power lines, scan control lines, the fan-out lines FL for connecting the pads and the data lines may be formed. Each of the TFTs of the pixels may include a gate electrode, a semiconductor layer, a source electrode, and a drain electrode. In a case where the scan driver 110 is formed in the non-display area NDA of the display panel 100, as illustrated in FIG. 6, the scan driver 110 may include TFTs.

The TFT layer TFTL may be disposed in the display area DA and in the non-display area NDA. For example, the TFTs of the pixels, the scan lines, the data lines, and the power lines of the TFT layer TFTL may be disposed in the display area DA. The scan control lines and the fan-out lines FL of the TFT layer TFTL may be disposed in the non-display area NDA.

The light-emitting element layer EML may be disposed on the TFT layer TFTL. The light-emitting element layer EML may include the pixels, each including a first electrode, a light-emitting layer, and a second electrode, and a pixel defining film defining the pixels. The light-emitting layer may be an organic light-emitting layer including an organic material. In this case, the light-emitting layer may include a hole transport layer, an organic light-emitting layer, and an electron transport layer. In response to a set or predetermined voltage being applied to the first electrode via each of the TFTs of the TFT layer TFTL and a cathode voltage being applied to the second electrode, holes and electrons may move to the organic light-emitting layer via the hole transport layer and the electron transport layer and may combine in the organic light-emitting layer to emit light. The pixels of the light-emitting element layer EML may be disposed in the display area DA.

The thin-film encapsulation layer TFEL may be disposed on the light-emitting element layer EML. The thin-film encapsulation layer TFEL prevents or substantially prevents the infiltration of oxygen or moisture into the light-emitting element layer EML. To this end, the thin-film encapsulation layer TFEL may include at least one inorganic film. The inorganic film may be a silicon nitride layer, a silicon oxynitride layer, a silicon oxide layer, a titanium oxide layer, or an aluminum oxide layer, but the present disclosure is not limited thereto. Also, the thin-film encapsulation layer TFEL protects the light-emitting element layer EML against foreign materials such as dust. To this end, the thin-film encapsulation layer TFEL may include at least one organic film. The organic film may include an acrylic resin, an epoxy resin, a phenolic resin, a polyamide resin, or a PI resin, but the present disclosure is not limited thereto.

The thin-film encapsulation layer TFEL may be disposed in both the display area DA and the non-display area NDA. The thin-film encapsulation layer TFEL may be disposed to cover the light-emitting element layer EML in the display area DA and the non-display area NDA and to cover the TFT layer TFTL in the non-display area NDA.

The touch sensor layer TSL may be disposed on the thin-film encapsulation layer TFEL. When the touch sensor layer TSL is disposed directly on the thin-film encapsulation layer TFEL, the thickness of the display device 10 can be reduced, as compared to when a separate touch panel including the touch sensor layer TSL is attached on the thin-film encapsulation layer TFEL.

The touch sensor layer TSL may include touch electrodes for detecting touch input from a user in a capacitive manner and touch lines for connecting pads and the touch electrodes. For example, the touch sensor layer TSL may detect touch input from the user in a self-capacitance manner or in a mutual capacitance manner. In the description that follows, it is assumed that the touch sensor layer TSL detects touch input from the user in, for example, the mutual capacitance manner, but the present disclosure is not limited thereto. The touch electrodes of the touch sensor layer TSL may be disposed in a touch sensor area TSA that overlaps with the display area DA, as illustrated in FIG. 5.

FIG. 6 is a plan view illustrating elements associated with the display unit of FIG. 5.

For convenience, FIG. 6 illustrates only subpixels P, scan lines SL, data lines DL, scan control lines SCL, a scan driver 110, the display driving circuit 200, and the display pads DP of the display unit DU.

Referring to FIG. 6, the scan lines SL, the data lines DL, and the subpixels P are disposed in the display area DA. The scan lines SL may be formed side-by-side in the first direction (e.g., the X-axis direction), and the data lines DL may be formed side-by-side in the second direction (e.g., the Y-axis direction).

Each of the subpixels P may be connected to at least one of the scan lines SL and one of the data lines DL. Each of the subpixels P may include TFTs, including a driving transistor and at least one switching transistor, a light-emitting element, and a capacitor. The light-emitting element may be an organic light-emitting diode (OLED). In response to scan signals being applied via the scan lines SL, the subpixels P may receive data voltages via the data lines DL and may emit light by supplying a driving current to the light-emitting elements thereof in accordance with the data voltages applied to the gate electrodes thereof.

The scan driver 110 may be connected to the display driving circuit 200 via the scan control lines SCL. As a result, the scan driver 110 may receive scan control signals from the display driving circuit 200. The scan driver 110 may generate scan signals in accordance with the scan control signals and may provide the scan signals to the scan lines SL.

FIG. 5 illustrates an example in which the scan driver 110 is formed in a part of the non-display area NDA on the left side of the display area DA, but the present disclosure is not limited thereto. In another example, the scan driver 110 may be formed in parts of the non-display area NDA on both the left and right sides of the display area DA.

The display driving circuit 200 is connected to the display pads DP and thus receives digital video data and timing signals. The display driving circuit 200 converts the digital video data into positive/negative analog data voltages and provides the positive/negative analog data voltages to the data lines DL via the fan-out lines FL. Also, the display driving circuit 200 generates scan control signals for controlling the scan driver 110 and provides the scan control signals via the scan control lines SCL. Subpixels P to which data voltages are to be provided are selected by the scan signals generated by the scan driver 110, and data voltages are provided to the selected subpixels P. The display driving circuit 200 may be formed as an integrated circuit (IC) and may be attached on the substrate SUB in a chip-on-glass (COG) bonding, chip-on-plastic (COP) bonding, or ultrasonic bonding manner.

The pad area PDA may include a display pad area DPA in which the display pads DP are disposed, a first touch pad area TPA1 in which first touch pads TP1 are disposed, and a second touch pad area TPA2 in which second touch pads TP2 are disposed. The first touch pad area TPA1 may be disposed on one side of the display pad area DPA, and the second touch pad area TPA2 may be disposed on the other side of the display pad area DPA. The display pads DP may be electrically connected to the display driving circuit 200.

The circuit board 300 may be attached onto the display pads DP, the first touch pads TP1, and the second touch pads TP2 via an anisotropic conductive film (ACF). The display pads DP may be electrically connected to the circuit board 300. The first touch pads TP1 and the second touch pads TP2 may be electrically connected to the touch driving circuit 400, which is disposed on the circuit board 300.

Figure 7:
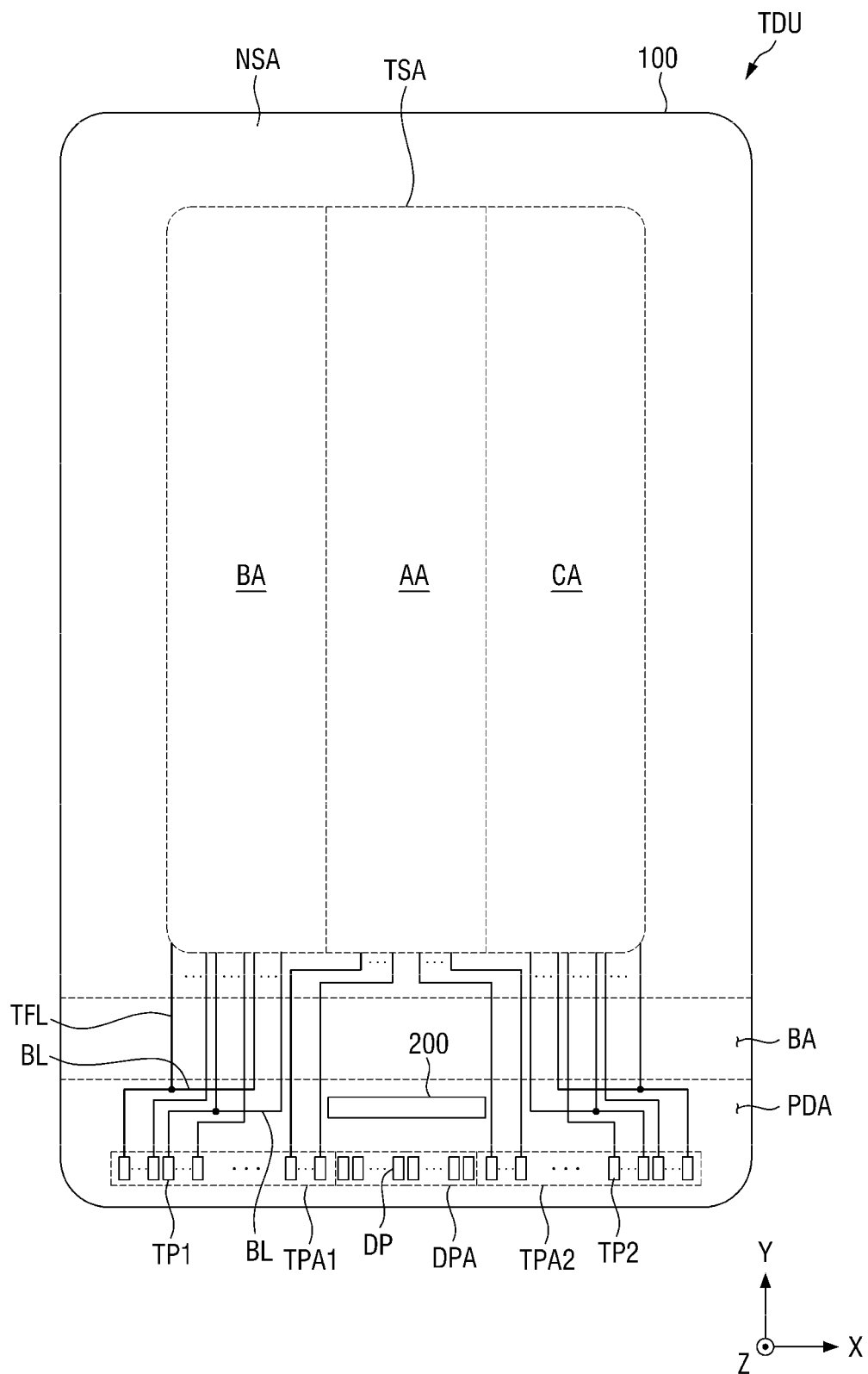
FIG. 7 is a plan view illustrating elements associated with a touch sensing unit of FIG. 5.
Figure 8A:
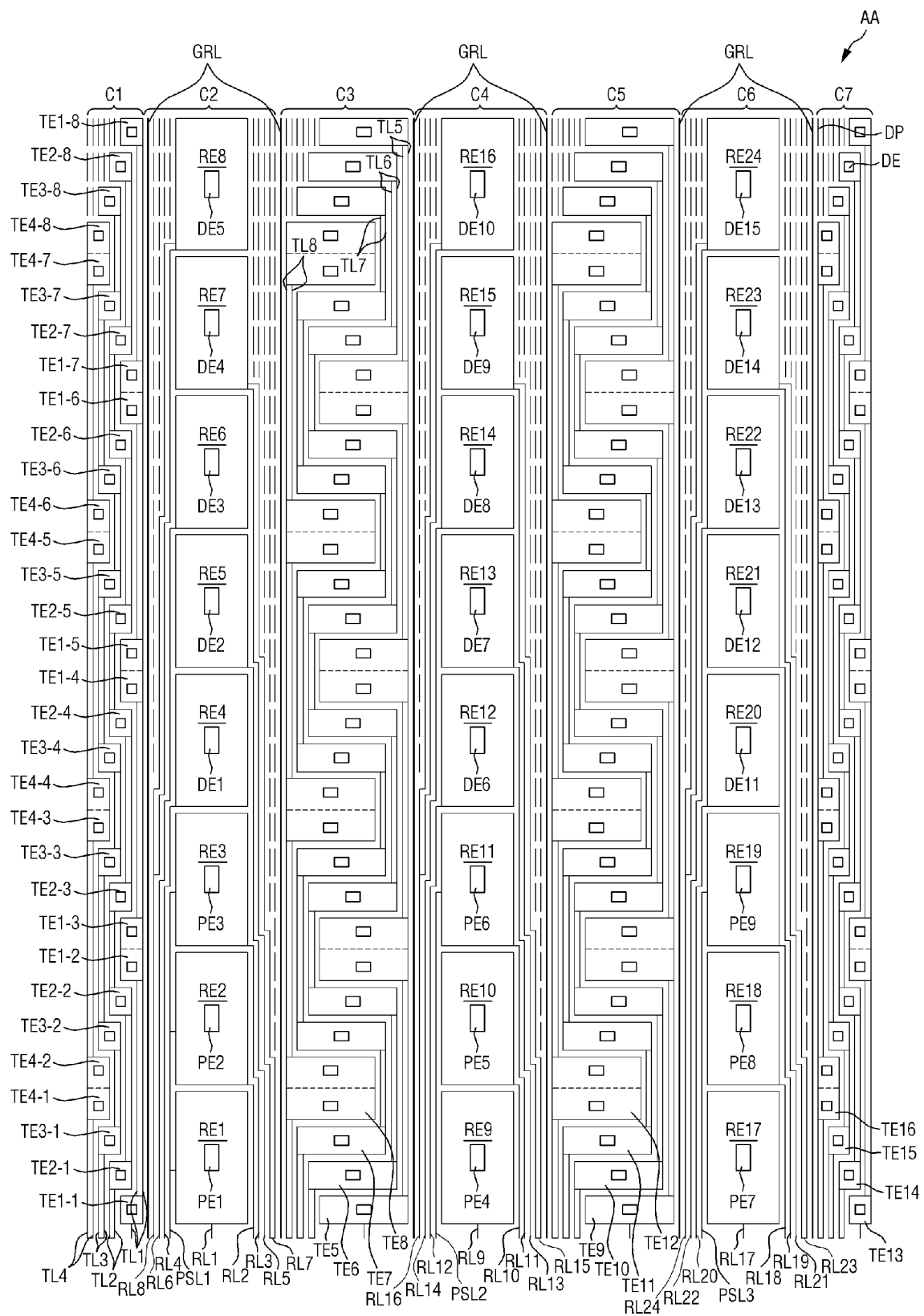
FIG. 8A is an enlarged plan view illustrating the "A" area of FIG. 7.

FIG. 7 is a plan view illustrating elements associated with the touch sensing unit of FIG. 5. FIG. 8A is an enlarged plan view illustrating an "A" area of FIG. 7.

For convenience, FIG. 7 illustrates only touch fan-out lines TFL, the first touch pads TP1, and the second touch pads TP2 of the touch pad area TPA.

Referring to FIGS. 7 and 8A, the touch sensing unit TDU includes a touch sensor area TSA for detecting touch input from the user and a touch periphery area TPA disposed on the periphery of the touch sensor area TSA. The touch sensor area TSA may overlap with the display area DA of the display unit DU, and the touch periphery area TPA may overlap with the non-display area NDA of the display unit DU.

The touch sensor area TSA may include an "A" area AA, a "B" area BA disposed on one side of the "A" area AA, and a "C" area CA disposed on the other side of the "A" area AA. A touch peripheral area NSA may include touch fan-out lines TFL for connecting the driving lines and the sensing lines of the touch sensor area TSA to the first touch pads TP1 and the second touch pads TP2. Some of the touch fan-out lines TFL may be connected by bridge lines BL. The touch peripheral area NSA may be a non-force sensing area.

As illustrated in FIG. 8A, the "A" area AA may include first through sixteenth driving electrodes TE1 through TE16 and first through twenty-fourth sensing electrodes RE1 through RE24. Driving electrodes and sensing electrodes will hereinafter be collectively referred to as touch electrodes.

In the "A" area AA, four driving electrodes may be disposed in each odd-numbered column, and eighth sensing electrodes may be disposed in each even-numbered column. For example, in a first column C1, the first through fourth driving electrodes TE1 through TE4 may be disposed, in a second column C2, the first through eighth sensing electrodes RE1 through RE8 may be disposed, in a third column C3, the fifth through eighth driving electrodes TE5 through TE8 may be disposed, in a fourth column C4, the ninth through sixteenth sensing electrodes RE9 through RE16 may be disposed, in a fifth column C5, the ninth through twelfth driving electrodes TE9 through TE12 may be disposed, in a sixth column C6, the seventeenth through twenty-fourth sensing electrodes RE17 through RE24 may be disposed, and in a seventh column C7, the thirteenth and sixteenth driving electrodes TE13 through TE16 may be disposed.

Sensing electrodes disposed in each column may form mutual capacitance with driving electrodes disposed on one side thereof and may also form mutual capacitance with driving electrodes on the other side thereof. For example, the first through eighth sensing electrodes RE1 through RE8, which are disposed in the second column C2, may form mutual capacitance with the first through fourth driving electrodes TE1 through TE4, which are disposed in the first column C1, and may also form mutual capacitance with the fifth through eighth driving electrodes TE5 through TE8, which are disposed in the third column C3.

Each of the first through fourth driving electrodes TE1 through TE4, which are disposed in the first column C1, may include a plurality of sub-driving electrodes. The first driving electrode TE1 may include (1-1)- through (1-5)-th sub-driving electrodes TE1-1 through TE1-5. The (1-1)- through (1-5)-th sub-driving electrodes TE1-1 through TE1-5 may be arranged in parallel in the second direction (e.g., the Y-axis direction). The (1-1)- through (1-5)-th sub-driving electrodes TE1-1 through TE1-5 may be electrically connected by a plurality of sub-driving lines (TL1-1 through TL1-5). For example, (1-1)-th sub-driving lines TL1-1 may be connected to the (1-1)- and (1-2)-th sub-driving electrodes TE1-1 and TE1-2, (1-2)-th sub-driving lines TL1-2 may be connected to the (1-2)- and (1-3)-th sub-driving electrodes TE1-2 and TE1-3, (1-3)-th sub-driving lines TL1-3 may be connected to the (1-3)- and (1-4)-th sub-driving electrodes TE1-3 and TE1-4, and (1-4)-th sub-driving lines TL1-4 may be connected to the (1-4)- and (1-5)-th sub-driving electrodes TE1-4 and TE1-5.

The (1-1)- through (1-5)-th sub-driving electrodes TE1-1 through TE1-5 may form mutual capacitance with the first through eighth sensing electrodes RE1 through RE8. For example, the (1-1)-th sub-driving electrode TE1-1 may form a mutual capacitance with the first sensing electrode RE1, the (1-2)-th sub-driving electrode TE1-2 may form mutual capacitance with the second and third sensing electrodes RE2 and RE3, the (1-3)-th sub-driving electrode TE1-3 may form mutual capacitance with the fourth and fifth sensing electrodes RE4 and RE5, the (1-4)-th sub-driving electrode TE1-4 may form mutual capacitance with the sixth and seventh sensing electrodes RE6 and RE7, and the (1-5)-th sub-driving electrode TE1-5 may form a mutual capacitance with the eighth sensing electrode RE8.

The second driving electrode TE2 may include (2-1)- through (2-8)-th sub-driving electrodes TE2-1 through TE2-8. The (2-1)- through (2-8)-th sub-driving electrodes TE2-1 through TE2-8 may be arranged in parallel in the second direction (e.g., the Y-axis direction). The (2-1)- through (2-8)-th sub-driving electrodes TE2-1 through TE2-8 may be electrically connected by a plurality of sub-driving lines (TL2-1 through TL2-7). For example, (2-1)-th sub-driving lines TL2-1 may be connected to the (2-1)- and (2-2)-th sub-driving electrodes TE2-1 and TE2-2, (2-2)-th sub-driving lines TL1-2 may be connected to the (2-2)- and (2-3)-th sub-driving electrodes TE2-2 and TE2-3, (2-3)-th sub-driving lines TL2-3 may be connected to the (2-3)- and (2-4)-th sub-driving electrodes TE2-3 and TE2-4, (2-4)-th sub-driving lines TL2-4 may be connected to the (2-4)- and (2-5)-th sub-driving electrodes TE2-4 and TE2-5, (2-5)-th sub-driving lines TL2-5 may be connected to the (2-5)- and (2-6)-th sub-driving electrodes TE2-5 and TE2-6, (2-6)-th sub-driving lines TL2-6 may be connected to the (2-6)- and (2-7)-th sub-driving electrodes TE2-6 and TE2-7, and (2-7)-th sub-driving lines TL2-7 may be connected to the (2-7)- and (2-8)-th sub-driving electrodes TE2-7 and TE2-8.

The (2-1)- through (2-8)-th sub-driving electrodes TE2-1 through TE2-8 may form mutual capacitance with the first through eighth sensing electrodes RE1 through RE8. For example, the (2-1)-th sub-driving electrode TE2-1 may form a mutual capacitance with the first sensing electrode RE1, the (2-2)-th sub-driving electrode TE2-2 may form a mutual capacitance with the second sensing electrode RE2, the (2-3)-th sub-driving electrode TE2-3 may form a mutual capacitance with the third sensing electrode RE3, the (2-4)-th sub-driving electrode TE2-4 may form a mutual capacitance with the fourth sensing electrode RE4, the (2-5)-th sub-driving electrode TE2-5 may form a mutual capacitance with the fifth sensing electrode RE5, the (2-6)-th sub-driving electrode TE2-6 may form a mutual capacitance with the sixth sensing electrode RE6, the (2-7)-th sub-driving electrode TE2-7 may form a mutual capacitance with the seventh sensing electrode RE7, and the (2-8)-th sub-driving electrode TE2-8 may form a mutual capacitance with the eighth sensing electrode RE8.

The third driving electrode TE3 may include (3-1)- through (3-8)-th sub-driving electrodes TE3-1 through TE3-8. The (3-1)- through (3-8)-th sub-driving electrodes TE3-1 through TE3-8 may be arranged in parallel in the second direction (e.g., the Y-axis direction). The (3-1)- through (3-8)-th sub-driving electrodes TE3-1 through TE3-8 may be electrically connected by (3-1) through (3-7)-th sub-driving lines TL3-1 through TL3-7. The configuration in which the (3-1)- through (3-8)-th sub-driving electrodes TE3-1 through TE3-8 are electrically connected by the (3-1) through (3-7)-th sub-driving lines TL3-1 through TL3-7 is substantially the same as the configuration in which the (2-1)- through (2-8)-th sub-driving electrodes TE2-1 through TE2-8 are electrically connected by the (2-1) through (2-7)-th sub-driving lines TL2-1 through TL2-7, and thus, a detailed description thereof may not be repeated. The (3-1)- through (3-8)-th sub-driving electrodes TE3-1 through TE3-8 may form mutual capacitance with the first through eighth sensing electrodes RE1 through RE8. The mutual capacitance formed between the (3-1)- through (3-8)-th sub-driving electrodes TE3-1 through TE3-8 and the first through eighth sensing electrodes RE1 through RE8 are substantially the same as the mutual capacitance formed between the (2-1)- through (2-8)-th sub-driving electrodes TE2-1 through TE2-8 and the first through eighth sensing electrodes RE1 through RE8, and thus, detailed descriptions thereof may not be repeated.

The fourth driving electrode TE4 may include (4-1)- through (4-5)-th sub-driving electrodes TE4-1 through TE4-5. The (4-1)- through (4-5)-th sub-driving electrodes TE4-1 through TE4-5 may be arranged in parallel in the second direction (e.g., the Y-axis direction). The (4-1)- through (4-5)-th sub-driving electrodes TE4-1 through TE4-5 may be electrically connected by (4-1) through (4-5)-th sub-driving lines TL4-1 through TL4-5. The configuration in which the (4-1)- through (4-5)-th sub-driving electrodes TE4-1 through TE4-5 are electrically connected by the (4-1) through (4-5)-th sub-driving lines TL4-1 through TL4-5 is substantially the same as the configuration in which the (1-1)- through (1-5)-th sub-driving electrodes TE1-1 through TE1-5 are electrically connected by the (1-1) through (1-5)-th sub-driving lines TL1-1 through TL1-5, and thus, a detailed description thereof may not be repeated. The (4-1)- through (4-5)-th sub-driving electrodes TE4-1 through TE4-5 may form a mutual capacitance with the first through eighth sensing electrodes RE1 through RE8. The mutual capacitance formed between the (4-1)- through (4-5)-th sub-driving electrodes TE4-1 through TE4-5 and the first through eighth sensing electrodes RE1 through RE8 are substantially the same as the mutual capacitance formed between the (1-1)- through (1-5)-th sub-driving electrodes TE1-1 through TE1-5 and the first through eighth sensing electrodes RE1 through RE8, and thus, detailed descriptions thereof may not be repeated.

Each of the fifth through eighth driving electrodes TE5 through TE8, which are disposed in the third column C3, may include a plurality of sub-driving electrodes. The fifth through eighth driving electrodes TE5 through TE8 have a different size from the first through fourth driving electrodes TE1 through TE4, which are disposed in the first column C1, and differ from the first through fourth driving electrodes TE1 through TE4 only in that they form mutual capacitance not only with the first through eighth sensing electrodes RE1 through RE8, but also with the ninth through sixteenth sensing electrodes RE9 through RE16, which are disposed in the fourth column C4. Thus, detailed descriptions of the fifth through eighth driving electrodes TE5 through TE8 may not be repeated.

Each of the ninth through twelfth driving electrodes TE9 through TE12, which are disposed in the fifth column C5, may include a plurality of sub-driving electrodes. The ninth through twelfth driving electrodes TE9 through TE12 have a different size from the first through fourth driving electrodes TE1 through TE4, which are disposed in the first column C1, and differ from the first through fourth driving electrodes TE1 through TE4 only in that they form mutual capacitance not only with the ninth through sixteenth sensing electrodes RE9 through RE16, which are disposed in the fourth column C4, but also with the seventeenth through twenty-fourth sensing electrodes RE17 through RE24, which are disposed in the sixth column C6. Thus, detailed descriptions of the ninth through twelfth driving electrodes TE9 through TE12 may not be repeated.

The first through eighth sensing electrodes RE1 through RE8, which are disposed in the second column C2, may be arranged in parallel in the second direction (e.g., the Y-axis direction). Each of the first through eighth sensing electrodes RE1 through RE8 may be connected to one sensing line. For example, the first sensing electrode RE1 may be connected to a first sensing line RL1, which is disposed on a first side of the first sensing electrode RE2; the second sensing electrode RE2 may be connected to a second sensing line RL2, which is disposed on a first side of the second sensing electrode RE2; the third sensing electrode RE3 may be connected to a third sensing line RL3, which is disposed on a first side of the third sensing electrode RE3; the fourth sensing electrode RE4 may be connected to a fourth sensing line RL4, which is disposed on a second side of the fourth sensing electrode RE4; the fifth sensing electrode RE5 may be connected to a fifth sensing line RL5, which is disposed on a first side of the fifth sensing electrode RE5; the sixth sensing electrode RE6 may be connected to a sixth sensing line RL6, which is disposed on a second side of the sixth sensing electrode RE6; the seventh sensing electrode RE7 may be connected to a plurality of seventh sensing lines RL7, which are disposed on a first side of the seventh sensing electrode RE7; and the eighth sensing electrode RE8 may be connected to a plurality of eighth sensing lines RL8. In order to reduce the resistances of the seventh sensing lines RL7 and the eighth sensing lines RL8, the numbers of seventh sensing lines RL7 and eighth sensing lines RL8 may be greater than the numbers of first sensing lines RL1, second sensing lines RL2, third sensing lines RL3, fourth sensing lines RL4, fifth sensing lines RL5, and sixth sensing lines RL6.

The ninth through sixteenth sensing electrodes RE9 through RE16, which are disposed in the fourth column C4, and the seventeenth through twenty-fourth sensing electrodes RE17 through RE24, which are disposed in the sixth column C6, may be substantially the same as the first through eighth sensing electrodes RE1 through RE8, which are disposed in the second column C2, and thus, detailed descriptions thereof may not be repeated.

The first through twenty fourth sensing electrodes RE1 through RE24 may be larger in size than the first through sixteenth driving electrodes TE1 through TE16.

The "A" area AA may be divided into the force sensing area PSA and the non-force sensing area NSA, as illustrated in FIG. 8A. In the force sensing area PSA, the first through third sensing electrodes RE1 through Re3, the ninth through eleventh sensing electrodes RE9 through RE11, and the seventeenth through nineteenth sensing electrodes RE17 through RE19 may be disposed.

Figure 9A:
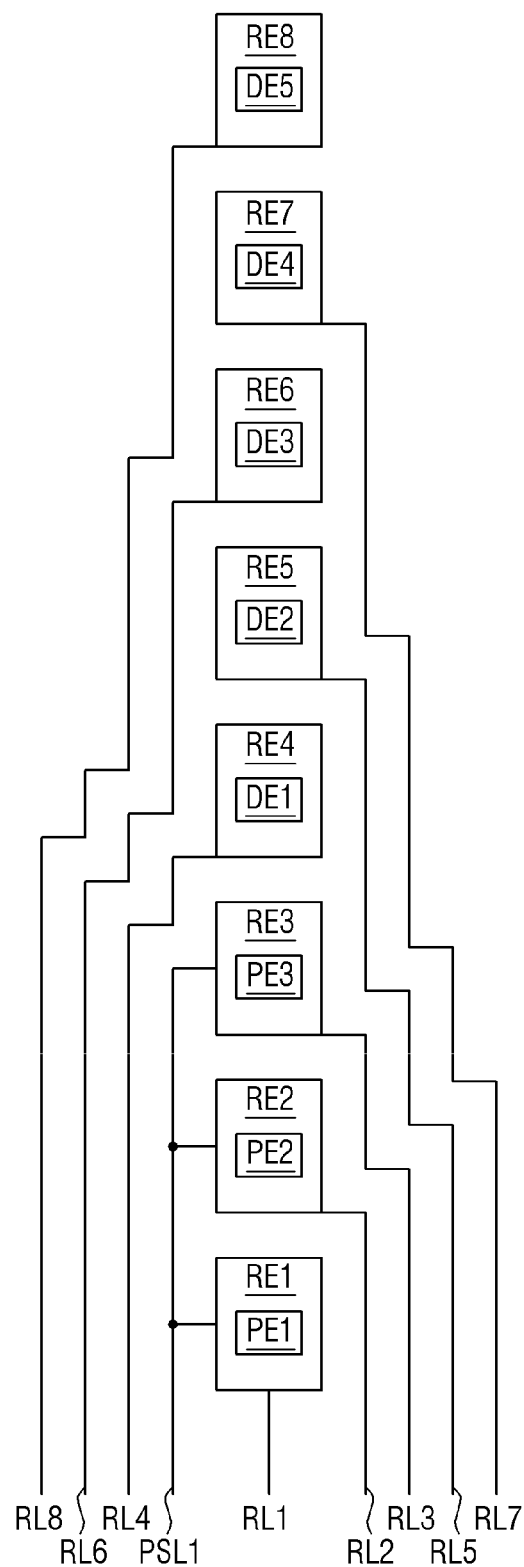
FIG. 9A illustrates sensing electrodes, sensing lines, and the force sensor line of FIG. 8A.

In the second column C2, first through third force sensor electrodes PE1 sensing electrode RE1. The first force sensor electrode PE1 may be electrically through PE3 may be disposed to be apart from the first through third sensing electrodes RE1 through RE3. The first through third force sensor electrodes PE1 through PE3 may be electrically connected to a first force sensor line PSL1. Referring to FIG. 9A, in a case where the first force sensor line PSL1 is disposed on one side (e.g., on the left side) of the array of the first through third sensing electrodes RE1 through RE3, the second and third sensing lines RL2 and RL3 may be disposed on the other side (e.g., on the right side) of the array of the first through third sensing electrodes ER1 through RE3.

The first force sensor electrode PE1 may be next to, but apart from, the first isolated from the first sensing electrode RE1. The first force sensor electrode PE1 may be surrounded by the first sensing electrode RE1.

The second force sensor electrode PE2 may be next to, but apart from, the second sensing electrode RE2. The second force sensor electrode PE2 may be electrically apart from the second sensing electrode RE2. The second force sensor electrode PE2 may be surrounded by the second sensing electrode RE2.

The third force sensor electrode PE3 may be next to, but apart from, the third sensing electrode RE3. The third force sensor electrode PE3 may be electrically isolated from the third sensing electrode RE3. The third force sensor electrode PE3 may be surrounded by the third sensing electrode RE3.

In the fourth column C4, fourth through sixth force sensor electrodes PE4 through PE6 may be disposed to be apart from the ninth through eleventh sensing electrodes RE9 through RE11. The fourth through sixth force sensor electrodes PE4 through PE6 may be electrically connected to a second force sensor line PSL2. The arrangement of the fourth through sixth force sensor electrodes PE4 through PE6 relative to the ninth through eleventh sensing electrodes RE9 through RE11 is substantially the same as the arrangement of the first through third force sensor electrodes PE1 through PE3 relative to the first through third sensing electrodes RE1 through RE3, and thus, a detailed description thereof may not be repeated.

In the sixth column C6, seventh through ninth force sensor electrodes PE7 through PE9 may be disposed to be apart from the seventeenth through nineteenth sensing electrodes RE17 through RE19. The seventh through ninth force sensor electrodes PE7 through PE9 may be electrically connected to a third force sensor line PSL3. The arrangement of the seventh through ninth force sensor electrodes PE7 through PE9 relative to the seventeenth through nineteenth sensing electrodes RE17 through RE19 is substantially the same as the arrangement of the first through third force sensor electrodes PE1 through PE3 relative to the first through third sensing electrodes RE1 through RE3, and thus, a detailed description thereof may not be repeated.

The first through ninth force sensor electrodes PE1 through PE9 may be electrically connected to one another. As a result, the first through ninth force sensor electrodes PE1 through PE9 may serve as a single force sensor electrode.

In the non-force sensing area NSA, the fourth through eighth sensing electrodes RE4 through RE8, the twelfth through sixteenth sensing electrodes RE12 through RE16, and the twentieth through twenty-fourth sensing electrodes RE20 through RE24 may be disposed.

In the second column C2, first through fifth dummy electrodes DE1 through DE5 may be disposed to be apart from the fourth through eighth sensing electrodes RE4 through RE8. The first through fifth dummy electrodes DE1 through DE5 may be floated (e.g., may have no voltage applied thereto or left electrically open).

The first dummy electrode DE1 may be next to, but apart from, the fourth sensing electrode RE4. The first dummy electrode DE1 may be electrically isolated from the fourth sensing electrode RE4 and may be floated. The first dummy electrode DE1 may be surrounded by the fourth sensing electrode RE4.

The second dummy electrode DE2 may be next to, but apart from, the fifth sensing electrode RE5. The second dummy electrode DE2 may be electrically isolated from the fifth sensing electrode RE5 and may be floated. The second dummy electrode DE2 may be surrounded by the fifth sensing electrode RE5.

The third dummy electrode DE3 may be next to, but apart from, the sixth sensing electrode RE6. The third dummy electrode DE3 may be electrically isolated from the sixth sensing electrode RE6 and may be floated. The sixth sensing electrode RE6 may be surrounded by the sixth sensing electrode RE6.

The fourth dummy electrode DE4 may be next to, but apart from, the seventh sensing electrode RE7. The third dummy electrode DE3 may be electrically isolated from the seventh sensing electrode RE7 and may be floated. The third dummy electrode DE3 may be surrounded by the seventh sensing electrode RE7.

The fifth dummy electrode DE5 may be next to, but apart from, the eighth sensing electrode RE8. The fifth dummy electrode DE5 may be electrically isolated from the eighth sensing electrode RE8 and may be floated. The fifth dummy electrode DE5 may be surrounded by the eighth sensing electrode RE8.

In the fourth column C4, sixth through tenth dummy electrodes DE6 through DE10 may be disposed to be apart from the twelfth through sixteenth sensing electrodes RE12 through RE16. The sixth through tenth dummy electrodes DE6 through DE10 may be floated. The arrangement of the sixth through tenth dummy electrodes DE6 through DE10 relative to the twelfth through sixteenth sensing electrodes RE12 through RE16 is substantially the same as the arrangement of the first through fifth dummy electrodes DE1 through DE5 relative to the fourth through eighth sensing electrodes RE4 through RE8, and thus, a detailed description thereof may not be repeated.

In the sixth column C6, eleventh through fifteenth dummy electrodes DE11 through DE15 may be disposed to be apart from the twentieth through twenty-fourth sensing electrodes RE20 through RE24. The eleventh through fifteenth dummy electrodes DE11 through DE15 may be floated. The arrangement of the eleventh through fifteenth dummy electrodes DE11 through DE15 relative to the twentieth through twenty-fourth sensing electrodes RE20 through RE24 is substantially the same as the arrangement of the first through fifth dummy electrodes DE1 through DE5 relative to the fourth through eighth sensing electrodes RE4 through RE8, and thus, a detailed description thereof may not be repeated.

In both the force sensing area PSA and the non-force sensing area NSA, driving dummy electrodes may be disposed to be apart from sub-driving electrodes. The driving dummy electrodes may be floated. The arrangement of the driving dummy electrodes relative to driving electrodes is substantially the same as the arrangement of the first through fifth dummy electrodes DE1 through DE5 relative to the fourth through eighth sensing electrodes RE4 through RE8, and thus, a detailed description thereof may not be repeated.

Due to the presence of the first through fifteenth dummy electrodes DE1 through 15, the parasitic capacitance of the first through twenty-fourth sensing electrodes RE1 through RE24 can be reduced. Also, due to the presence of the driving dummy electrodes, the parasitic capacitance of the driving electrodes can be reduced.

Ground lines GRL may be disposed between the array of the first through fourth driving electrodes TE1 through TE4 in the first column C1 and the array of the first through eighth sensing electrodes RE1 through RE8 in the second column C2, between the array of the first through eighth sensing electrodes RE1 through RE8 in the second column C2 and the array of the fifth through eighth driving electrode TE5 through TE8 in the third column C3, between the array of the fifth through eighth driving electrode TE5 through TE8 in the third column C3 and the array of the ninth through sixteenth sensing electrodes RE9 through RE16 in the fourth column C4, between the array of the ninth through sixteenth sensing electrodes RE9 through RE16 in the fourth column C4 and the array of the ninth through twelfth driving electrodes TE9 through TE12 in the fifth column C5, between the array of the ninth through twelfth driving electrodes TE9 through TE12 in the fifth column C5 and the array of the seventeenth through twenty-fourth sensing electrodes RE17 through RE24 in the sixth column C6, and between the array of the seventeenth through twenty-fourth sensing electrodes RE17 through RE24 in the sixth column C6 and the array of the thirteenth through sixteenth driving electrodes TE13 through TE16 in the seventh column C7. Since the ground lines GRL are connected to a ground source, the ground lines GRL can prevent or substantially prevents adjacent sub-driving lines and sensing lines from affecting one another.

Dummy patterns DPT may be formed in regions where the driving electrodes, the sensing electrodes, the sub-driving lines, and the sensing lines are not disposed. The dummy patterns DPT may be disposed on the same layer as, but apart from, the driving electrodes, the sensing electrodes, the sub-driving lines, and the sensing lines. Due to the presence of the dummy patterns DPT, the regions where the driving electrodes, the sensing electrodes, the sub-driving lines, and the sensing lines are not disposed can be prevented or substantially prevented from becoming visible to the user, and as a result, the degradation of the display quality of the display device 10 can be prevented or substantially prevented.

Figure 8B:
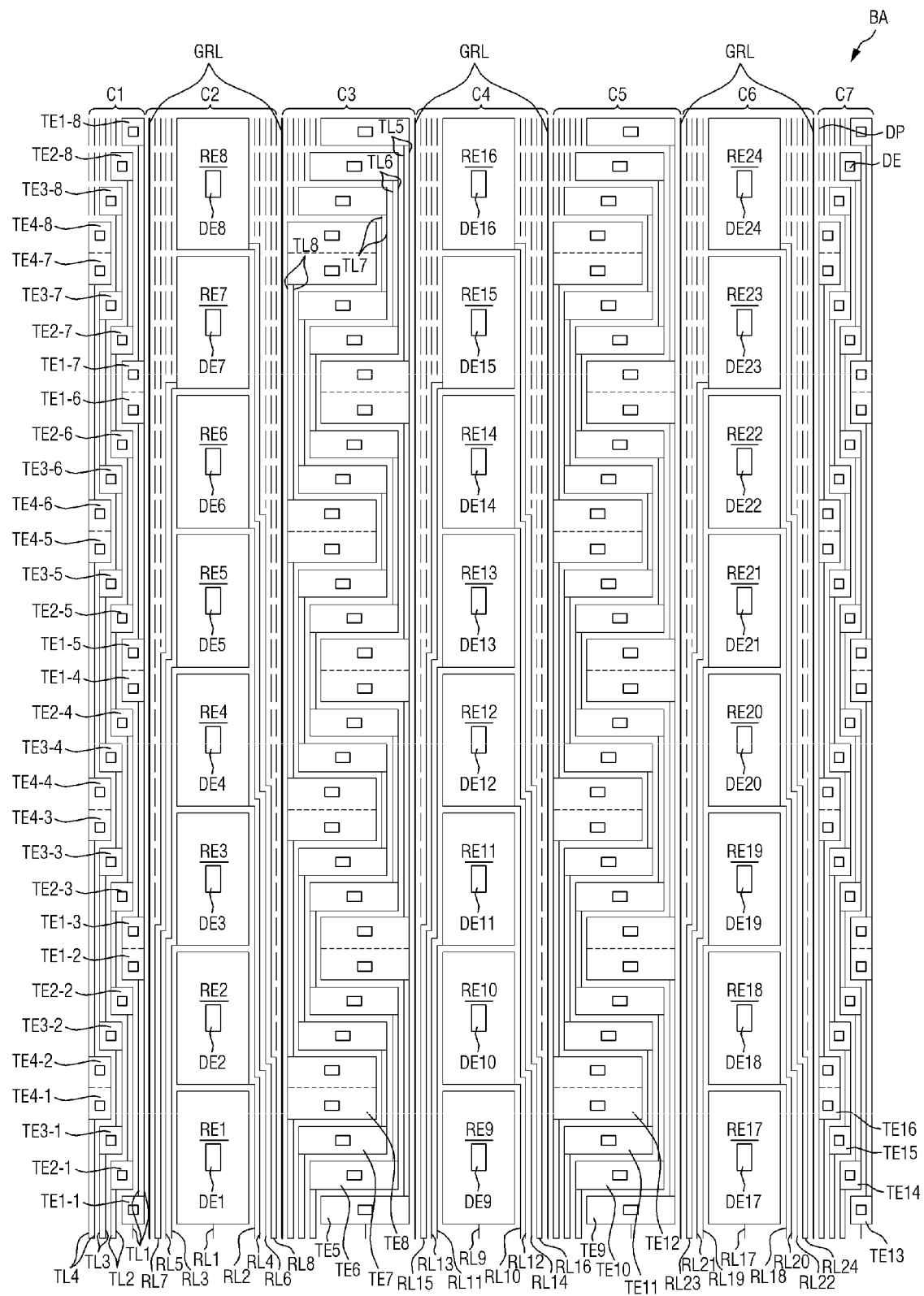
FIG. 8B is an enlarged plan view illustrating the "B" area of FIG. 7.

The dummy patterns DPT may be floated. In some examples, the dummy patterns DPT may be electrically connected to the ground lines GRL, as illustrated in FIG. 8B. In this case, since the dummy patterns DPT are connected to the ground source, adjacent sub-driving lines and sensing lines can be further prevented or substantially prevented from affecting one another.

Referring to FIG. 8A, the first through twelfth driving electrodes TE1 through TE12, the first through twenty-fourth sensing electrodes RE1 through RE24, the first through ninth force sensor electrodes PE1 through PE9, the first through fifteenth dummy electrodes DE1 through DE15, the sub-driving lines, the sensing lines, and the force sensor lines, which are formed in the touch sensor area TSA, may all be disposed on the same layer. Also, since the first through twelfth driving electrodes TE1 through TE12, the first through twenty-fourth sensing electrodes RE1 through RE24, the first through ninth force sensor electrodes PE1 through PE9, the first through fifteenth dummy electrodes DE1 through DE15, the sub-driving lines, the sensing lines, and the force sensor lines are all apart from one another, the first through twelfth driving electrodes TE1 through TE12, the first through twenty-fourth sensing electrodes RE1 through RE24, the first through ninth force sensor electrodes PE1 through PE9, the first through fifteenth dummy electrodes DE1 through DE15, the sub-driving lines, the sensing lines, and the force sensor lines can be electrically isolated from one another. Thus, since the elements for detecting touch input and the elements for detecting pressure input can be formed in the touch sensor area TSA as a single layer, the manufacturing cost of the elements for detecting touch input and the elements for detecting pressure input and the amount of time that it takes to fabricate the elements for detecting touch input and the elements for detecting pressure input can be reduced. Accordingly, the manufacturing cost of the touch sensing unit TDU can be reduced.

According to the embodiment of FIGS. 7 and 8A, the touch sensing unit TDU can detect not only touch input, but also pressure input, from the user because the force sensor electrodes PE1 through PE9, instead of dummy electrodes, are formed in the force sensing area PSA. That is, since the touch sensing unit TDU can detect not only touch input, but also pressure input, from the user, a separate force sensor is not needed, and as a result, the manufacturing cost of the touch sensing unit TDU can be reduced.

FIGS. 7 and 8A illustrate that each of the driving electrodes includes a plurality of sub-driving electrodes, and that the sensing electrodes are larger in size than the sub-driving electrodes, but the present disclosure is not limited thereto. In some examples, each of the sensing electrodes may include a plurality of sub-driving electrodes, and the driving electrodes may be larger in size than the sub-driving electrodes. In some examples, the driving electrodes and the sensing electrodes may each include a plurality of sub-driving electrodes.

FIG. 8B is an enlarged plan view illustrating the "B" area of FIG. 7.

The "B" area BA of FIG. 8B differs from the "A" area AA of FIG. 8A in that the "B" area BA of FIG. 8B does not include force sensor electrodes, but includes only dummy electrodes.

Referring to FIG. 8B, since in the second column C2 of the "A" area AA, the first force sensor line PSL1 is additionally disposed, the sensing lines disposed in a second column C2 of the "B" area BA may have a different connection structure from the sensing lines disposed in the second column C2 of the "A" area AA.

Figure 9B:
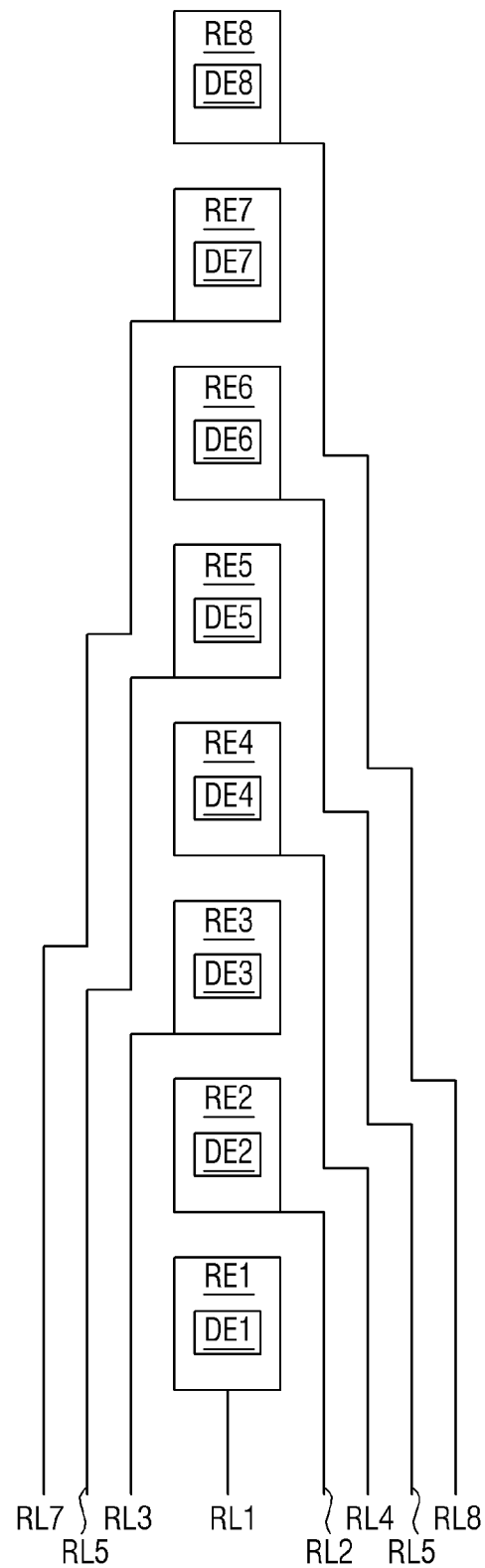
FIG. 9B illustrates sensing electrodes and sensing lines of FIG. 8B.

For example, referring to FIGS. 8B and 9B, in the "B" area BA, a first sensing line RL1 may be connected to the first sensing electrode RE1 from below the first sensing electrode RE1, a second sensing line RL2, a third sensing line RL3, a fourth sensing line RL4, a fifth sensing line RL5, a sixth sensing line RL6, seventh sensing lines RL7, and eighth sensing lines RL8 may be connected to the second, third, fourth, fifth, sixth, seventh, and eighth sensing electrodes RE2, RE3, RE4, RE5, RE6, RE7, and RE8 alternately from the left side and the right side of the array of the second, third, fourth, fifth, sixth, seventh, and eighth sensing electrodes RE2, RE3, RE4, RE5, RE6, RE7, and RE8. For example, in the "B" area BA, the second sensing line RL2 may be connected to the second sensing electrode RE2 from the right side of the second sensing electrode RE2, the third sensing line RL3 may be connected to the third sensing electrode RE3 from the left side of the third sensing electrode RE3, the fourth sensing line RL4 may be connected to the fourth sensing electrode RE4 from the right side of the second sensing electrode RE2, the fifth sensing line RL5 may be connected to the fifth sensing electrode RE5 from the left side of the fifth sensing line RL5, the sixth sensing line RL6 may be connected to the sixth sensing electrode RE6 from the right side of the sixth sensing electrode RE6, the seventh sensing lines RL7 may be connected to the seventh sensing electrode RE7 from the left side of the seventh sensing electrode RE7, and the eighth sensing lines RL8 may be connected to the eighth sensing electrode RE8 from the right side of the eighth sensing electrode RE8. That is, in the "B" area BA, the number of sensing lines disposed on the right side of the array of the first through eighth sensing electrodes RE1 through RE8 may be greater than the number of sensing lines disposed on the left side of the array of the first through eighth sensing electrodes RE1 through RE8.

Referring to FIGS. 8A and 9A, in the "A" area AA, the first sensing line RL1 may be connected to the first sensing electrode RE1 from below the first sensing electrode RE1, and the second and third sensing lines RL2 and RL3 may be connected to the second and third sensing electrodes RE2 and RE3, respectively, from the right side of the array of the first through third sensing electrodes RE1 through RE3. In this case, the first force sensor line PSL1 may be disposed on the left side of the array of the first through third sensing electrodes RE1 through RE3. Accordingly, the first force sensor line PSL1 can be electrically connected to the first through third force sensor electrodes PE1 through PE3 without being interfered with by the first through third sensing lines RL1 through RL3.

Also, in the "A" area AA, the fourth sensing line RL4, the fifth sensing line RL5, the sixth sensing line RL6, the seventh sensing lines RL7, and the eighth sensing lines RL8 are connected to the fourth, fifth, sixth, seventh, and eighth sensing electrodes RE4, RE5, RE6, RE7, and RE8 alternately from the left side and the right side of the array of the fourth, fifth, sixth, seventh, and eighth sensing electrodes RE4, RE5, RE6, RE7, and RE8. For example, in the "A" area AA, the fourth sensing line RL4 may be connected to the fourth sensing electrode RE4 from the right side of the second sensing electrode RE2, the fifth sensing line RL5 may be connected to the fifth sensing electrode RE5 from the left side of the fifth sensing line RL5, the sixth sensing line RL6 may be connected to the sixth sensing electrode RE6 from the right side of the sixth sensing electrode RE6, the seventh sensing lines RL7 may be connected to the seventh sensing electrode RE7 from the left side of the seventh sensing electrode RE7, and the eighth sensing lines RL8 may be connected to the eighth sensing electrode RE8 from the right side of the eighth sensing electrode RE8. That is, in the "A" area AA, the number of sensing lines disposed on the right side of the array of the first through eighth sensing electrodes RE1 through RE8 may be the same as the number of sensing lines and force sensor lines disposed on the left side of the array of the first through eighth sensing electrodes RE1 through RE8.

Sensing lines (RL9 through RL16) in a fourth column C4 of the "B" area BA and sensing lines (RL17 through RL24) in a sixth column C6 of the "B" area BA have substantially the same connection structure as the sensing lines (RL1 through RL8) in the second column C2 of the "B" area BA, and thus, detailed descriptions thereof may not be repeated. Also, sensing lines (RL9 through RL16) and the second force sensor line PSL2 in the fourth column C4 of the "A" area AA and sensing lines (RL17 through RL24) and the third force sensor line PSL3 in the sixth column C6 of the "A" area AA have substantially the same connection structure as the sensing lines (RL1 through RL8) and the first force sensor line PSL1 in the second column C2 of the "B" area BA, and thus, detailed descriptions thereof may not be repeated.

The "C" area CA of FIG. 7 may be formed in substantially the same manner as the "B" area BA of FIG. 8B, and thus, a detailed description thereof may not be repeated.

Figure 10:
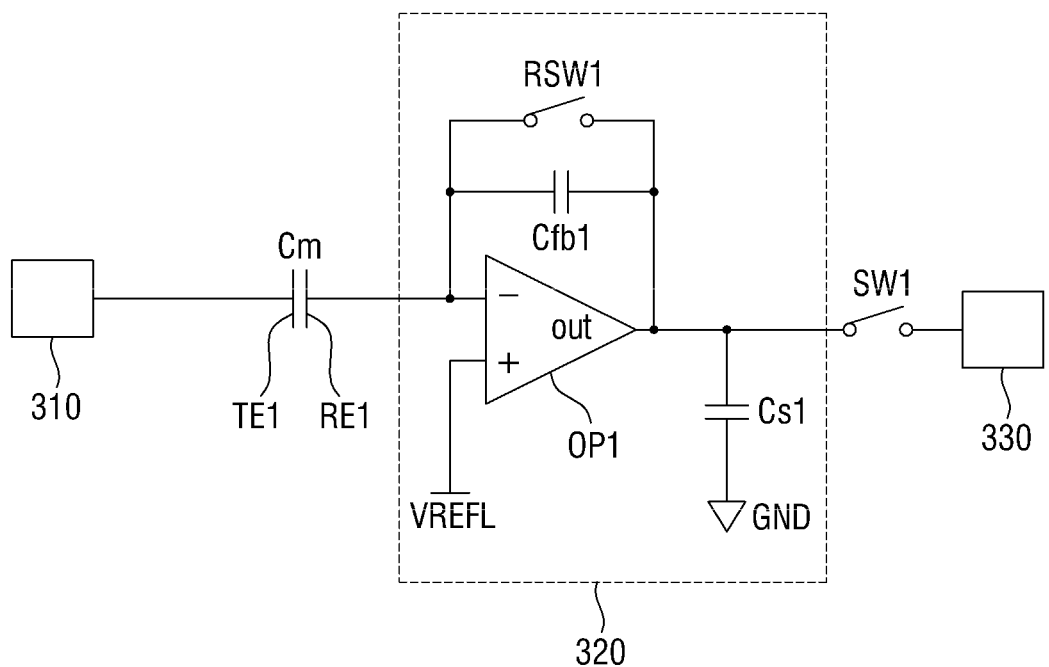
FIG. 10 illustrates how a touch sensing unit according to an embodiment of the present disclosure detects touch input.

FIG. 10 illustrates how a touch sensing unit according to an embodiment of the present disclosure detects touch input. For convenience, FIG. 10 illustrates only a mutual capacitance Cm formed between the first driving electrode TE1 and the first sensing electrode RE1.

Referring to FIG. 10, the touch driving circuit 400 may include a touch driving signal output part 310, a touch sensing part 320, and a first analog-to-digital converter (ADC) 330.

The touch driving signal output part 310 outputs touch driving signals to driving electrodes via driving lines. For example, the touch driving signal output part 310 may output a first touch driving signal to the first driving electrode TE1 via a first driving line. Each of the touch driving signals may include a plurality of pulses. The touch driving signal output part 310 may output the touch driving signals to the driving lines in a set or predetermined order.

The touch sensing part 320 detects voltages charged in mutual capacitance by sensing electrodes. For example, the touch sensing part 320 may detect a voltage charged in the mutual capacitance Cm by the first sensing electrode RE1.

The touch sensing part 320 may include a first operational amplifier OP1, a first feedback capacitor Cfb1, and a first reset switch RSW1. The first operational amplifier OP1 includes a first input terminal "−", a second input terminal "+", and an output terminal "out". The first input terminal "−" of the first operational amplifier OP1 may be connected to the first sensing line RL1, the second input terminal "+" of the first operational amplifier OP1 may be connected to an initialization voltage line VREFL to which an initialization voltage is supplied, and the output terminal "out" of the first operational amplifier OP1 may be connected to a first storage capacitor Cs1. The first storage capacitor Cs1 is connected between the output terminal "out" of the first operational amplifier OP1 and a ground source, and stores an output voltage Vout1 of the first operational amplifier OP1. The first feedback capacitor Cfb1 and the first reset switch RSW1 may be connected in parallel between the first input terminal "−" and the output terminal "out" of the first operational amplifier OP1. The first reset switch RSW1 controls the connection between the two ends of the first feedback capacitor Cfb1. When the first reset switch RSW1 is turned on so that respective ends of the first feedback capacitor Cfb1 are connected, the first feedback capacitor Cfb1 may be reset.

The output voltage Vout1 of the first operational amplifier OP1 may be defined by Equation (1):

$$Vout1 = \frac{Vcm \times Vt1}{Cfb1} \quad \text{Equation (1)}$$

where Vout1 denotes the output voltage of the first operational amplifier OP1, Vcm denotes the capacity of the mutual capacitance Cm, Cfb1 denotes the capacitance of the first feedback capacitor Cfb1, and Vt1 denotes the voltage charged in the mutual capacitance Cm.

The first ADC 330 may be connected to the first storage capacitor Cs1 via a first switch SW1. The first switch SW1 controls the connection between the first ADC 330 and the first storage capacitor Cs1. Since the first ADC 330 is connected to the first storage capacitor Cs1 in response to the first switch SW1 being turned on, the first ADC 330 can convert the output voltage Vout1 stored in the first storage capacitor Cs1 into digital data and can output the digital data.

According to the embodiment of FIG. 10, the touch sensing unit TDU can detect touch input from the user in a mutual capacitance manner.

Figure 11:
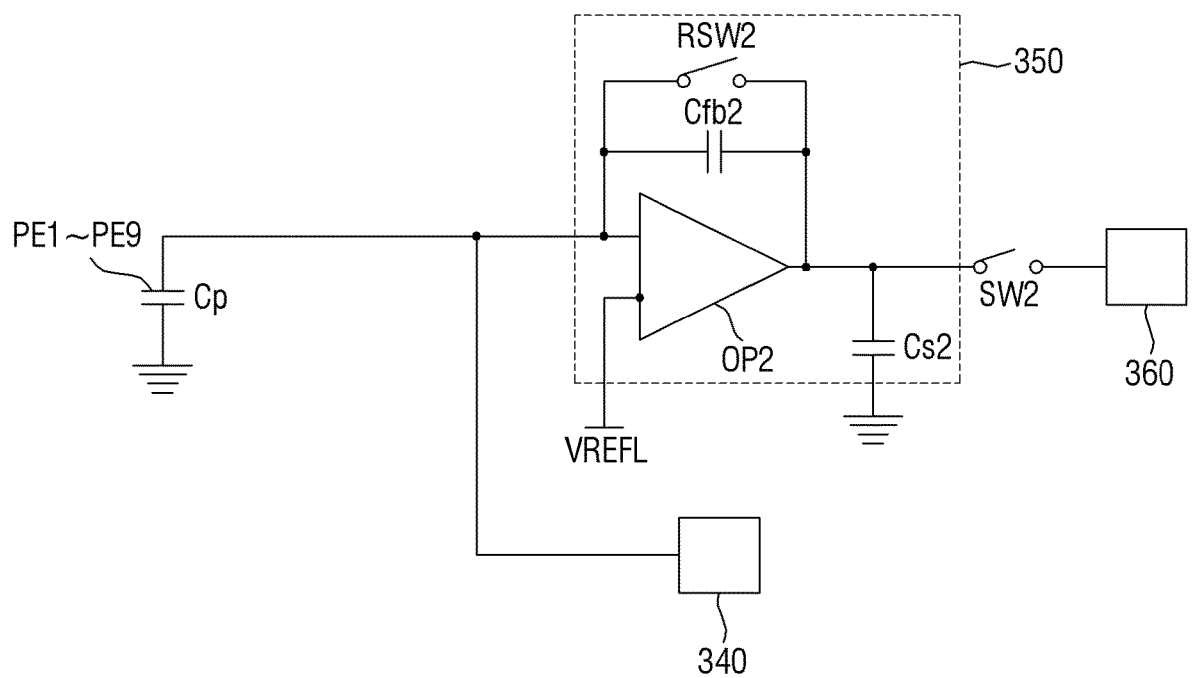
FIG. 11 is a schematic diagram illustrating how a force sensor according to an embodiment of the present disclosure detects pressure input.

FIG. 11 is a schematic diagram illustrating how a force sensor according to an embodiment of the present disclosure detects pressure input. For convenience, FIG. 11 illustrates only a self-capacitance Cp of the first through ninth force sensor electrodes PE1 through PE9.

Referring to FIG. 11, the touch driving circuit 400 may include a force driving signal output part 340, a force sensing part 350, and a second ADC 360.

The force driving signal output part 340 outputs force driving signals to the first through ninth force sensor electrodes PE1 through PE9 via the first through third force sensor lines PSL1 through PSL3. Each of the force driving signals may include a plurality of pulses. The force driving signal output part 340 may output the force driving signals to the first through third force sensor lines PSL1 through PSL3 at the same time.

The force sensing part 350 may detect a voltage charged in the self-capacitance Cs. For example, the force sensing part 350 may detect the voltage charged in the self-capacitance Cs via the first through third force sensor lines PSL1 through PSL3.

The force sensing part 350 may include a second operational amplifier OP2, a second feedback capacitor Cfb2, and a second reset switch RSW2. The second operational amplifier OP2 includes a first input terminal "−", a second input terminal "+", and an output terminal "out". The first input terminal "−" of the second operational amplifier OP2 may be connected to the first through third force sensor lines PSL1 through PSL3, the second input terminal "+" of the second operational amplifier OP2 may be connected to an initialization voltage line VREFL to which an initialization voltage is supplied, and the output terminal "out" of the second operational amplifier OP2 may be connected to a second storage capacitor Cs2. The second storage capacitor Cs2 is connected between the output terminal "out" and a ground source and stores an output voltage Vout2 of the second operational amplifier OP2. The second feedback capacitor Cfb2 and the second reset switch RSW2 may be connected in parallel between the first input terminal "−" and the output terminal "out" of the second operational amplifier OP2. The second reset switch RSW2 controls the connection between the two ends of the second feedback capacitor Cfb2. When the second reset switch RSW2 is turned on so that respective ends of the second feedback capacitor Cfb2 are connected, the second feedback capacitor Cfb2 may be reset.

The output voltage Vout2 of the second operational amplifier OP2 may be defined by Equation (2):

$$Vout2 = \frac{Vcs \times Vt2}{Cfb2} \quad \text{Equation (2)}$$

where Vout2 denotes the output voltage of the second operational amplifier OP2, Vcs denotes the capacity of the self-capacitance Cp, Cfb2 denotes the capacitance of the second feedback capacitor Cfb2, and Vt2 denotes the voltage charged in the self-capacitance Cp.

The second ADC 360 may be connected to the second storage capacitor Cs2 via a second switch SW2. The second switch SW2 controls the connection between the second ADC 360 and the second storage capacitor Cs2. Since the second ADC 360 is connected to the second storage capacitor Cs2 in response to the second switch SW2 being turned on, the second ADC 360 can convert the output voltage Vout2 stored in the second storage capacitor Cs2 into digital data and can output the digital data.

According to the embodiment of FIG. 11, the touch sensing unit TDU can detect pressure input from the user in a self-capacitance manner.

Figure 12:
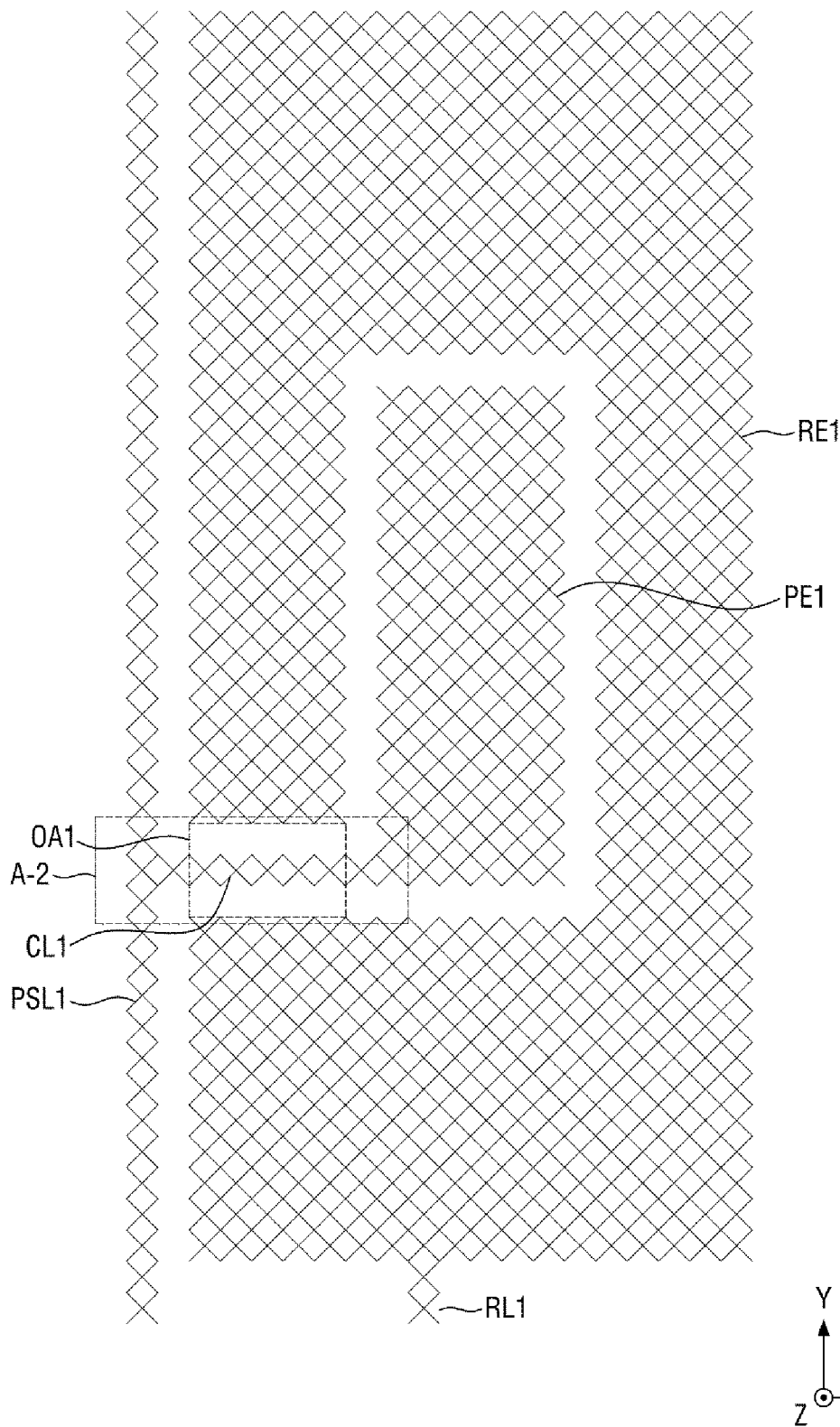
FIG. 12 is an enlarged plan view illustrating a first sensing electrode and a first force sensor electrode of FIG. 8A.

FIG. 12 is an enlarged plan view illustrating a first sensing electrode and a first force sensor electrode of FIG. 8A. For example, FIG. 12 illustrates the first sensing electrode RE1, the first force sensor electrode PE1, the first sensing line RL1, a first connecting line CL1, and the first pressures sensor line PSL1 of FIG. 8A.

Referring to FIG. 12, the first sensing electrode RE1, the first force sensor electrode PE1, the first sensing line RL1, the first connecting line CL1, and the first pressures sensor line PSL1 may be formed as mesh- or net-type electrodes. Thus, the first sensing electrode RE1, the first force sensor electrode PE1, the first sensing line RL1, the first connecting line CL1, and the first pressures sensor line PSL1 may not overlap with the subpixels P. Accordingly, the subpixels P can be prevented from being hidden by the first sensing electrode RE1, the first force sensor electrode PE1, the first sensing line RL1, the first connecting line CL1, and the first pressures sensor line PSL1.

The first sensing electrode RE1, the first force sensor electrode PE1, the first sensing line RL1, the first connecting line CL1, and the first pressures sensor line PSL1 may be disposed on the same layer. Since the first sensing electrode RE1, the first force sensor electrode PE1, the first sensing line RL1, the first connecting line CL1, and the first pressures sensor line PSL1 are apart from one another, the first sensing electrode RE1, the first force sensor electrode PE1, the first sensing line RL1, the first connecting line CL1, and the first pressures sensor line PSL1 can be electrically isolated from one another. Due to the presence of the first force sensor electrode PE1, the overlapping area of the first sensing electrode RE1 and the second electrode 173 in the display area DA can be reduced, and as a result, the parasitic capacitance of the first sensing electrode RE1 can be lowered.

The first sensing electrode RE1 may be formed as a rectangular frame. The first sensing electrode RE1 may include a single empty space ES formed in the middle thereof. In the empty space ES of the first sensing electrode RE1, a single first force sensor electrode PE1 may be disposed. The first sensing electrode RE1 may be disposed to surround the first force sensor electrode PE1. The first force sensor electrode PE1 may be formed to have a rectangular shape in a plan view, but the planar shape of the first force sensor electrode PE1 is not particularly limited.

The first sensing electrode RE1 may include a first open area OA1 which allows the first force sensor electrode PE1 in the empty space ES of the first sensing electrode RE1 to be connected to the first force sensor line PSL1 on the outside of the first sensing electrode RE1. In the first open area OA1, the first connecting line CL1, which is connected to the first force sensor electrode PE1 and the first force sensor line PSL1, may be disposed. One end of the first connecting line CL1 may be connected to the first force sensor electrode PE1, and the other end of the first connecting line CL1 may be connected to the first force sensor line PSL1.

The connections between the force sensor electrodes disposed in the other sensing electrodes and the first through third force sensor lines PSL1 through PSL3 may be substantially the same as that described above with reference to FIG. 12.

According to the embodiment of FIG. 12, the touch sensing unit TDU includes force sensor electrodes that are disposed apart from sensing electrodes and can thus be electrically isolated from the sensing electrodes. Therefore, the touch sensing unit TDU can detect not only touch input, but also pressure input, from the user.

Figure 13:
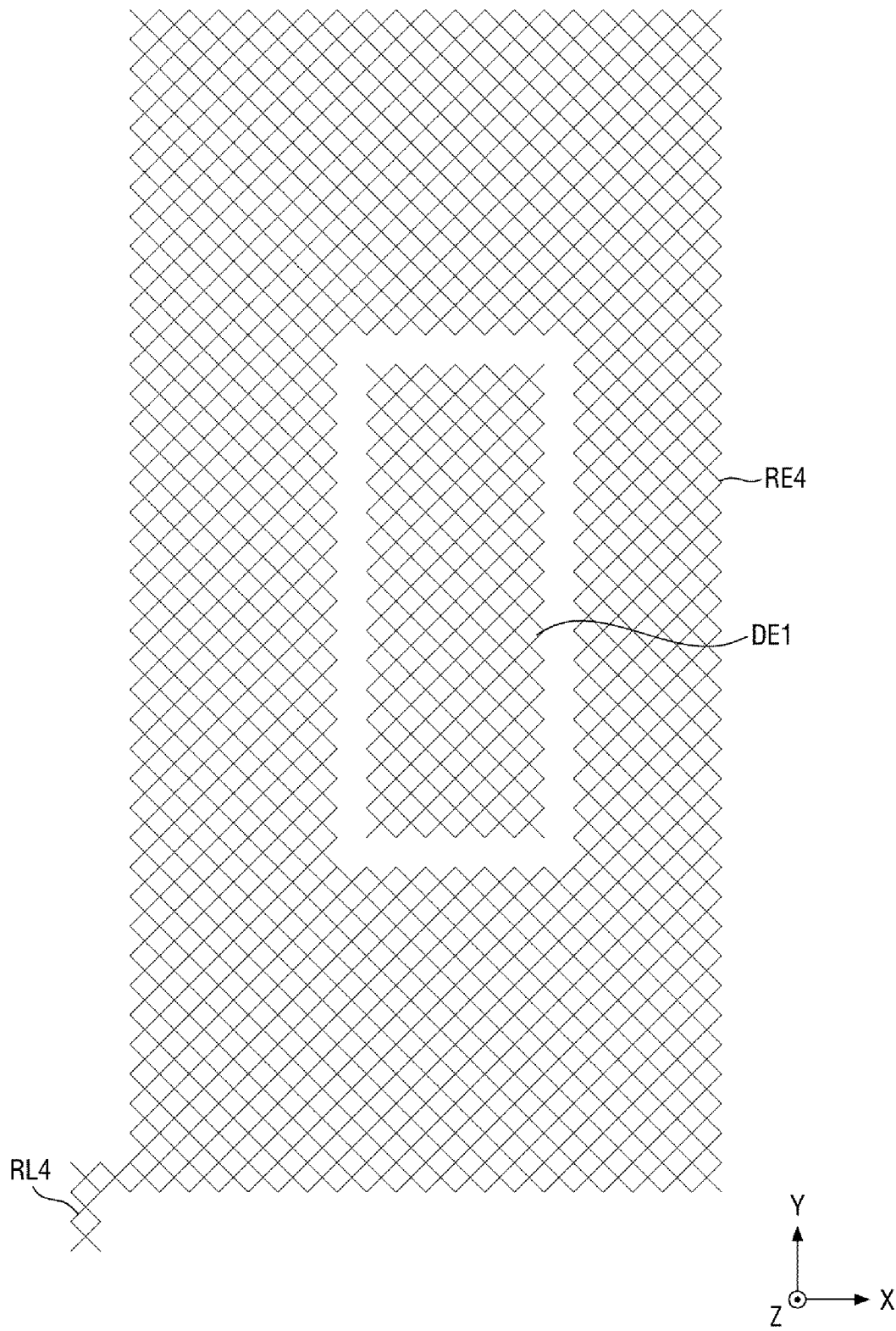
FIG. 13 is an enlarged plan view illustrating a fourth sensing electrode and a first dummy electrode of FIG. 8B.

FIG. 13 is an enlarged plan view illustrating a fourth sensing electrode and a first dummy electrode of FIG. 8B.

For example, FIG. 13 illustrates the fourth sensing electrode RE4, the first dummy electrode DE1, and the fourth sensing line RL4.

Referring to FIG. 13, the fourth sensing electrode RE4, the first dummy electrode DE1, and the fourth sensing line RL4 may be formed as mesh- or net-type electrodes. Thus, the fourth sensing electrode RE4, the first dummy electrode DE1, and the fourth sensing line RL4 may not overlap with the subpixels P. Accordingly, the subpixels P can be prevented from being hidden by the fourth sensing electrode RE4, the first dummy electrode DE1, and the fourth sensing line RL4.

The fourth sensing electrode RE4, the first dummy electrode DE1, and the fourth sensing line RL4 may be disposed on the same layer. Since the fourth sensing electrode RE4, the first dummy electrode DE1, and the fourth sensing line RL4 are apart from one another, the fourth sensing electrode RE4, the first dummy electrode DE1, and the fourth sensing line RL4 can be electrically isolated from one another. Due to the presence of the first dummy electrode DE1, the overlapping area of the fourth sensing electrode RE4 and the second electrode 173 in the display area DA can be reduced, and as a result, the parasitic capacitance of the fourth sensing electrode RE4 can be lowered.

The fourth sensing electrode RE4 may be formed as a rectangular frame. fourth sensing electrode RE4 may include a single empty space ES formed in the middle thereof. In the empty space ES of the fourth sensing electrode RE4, a single first dummy electrode EE1 may be disposed. The fourth sensing electrode RE4 may be disposed to surround the first dummy electrode EE1. The first dummy electrode DE1 may be formed to have a rectangular shape in a plan view, but the planar shape of the first dummy electrode DE1 is not particularly limited.

The structure of the other sensing electrodes and the structure of the dummy electrodes formed in the other sensing electrodes may be substantially the same as those described above with reference to FIG. 13.

Figure 14:
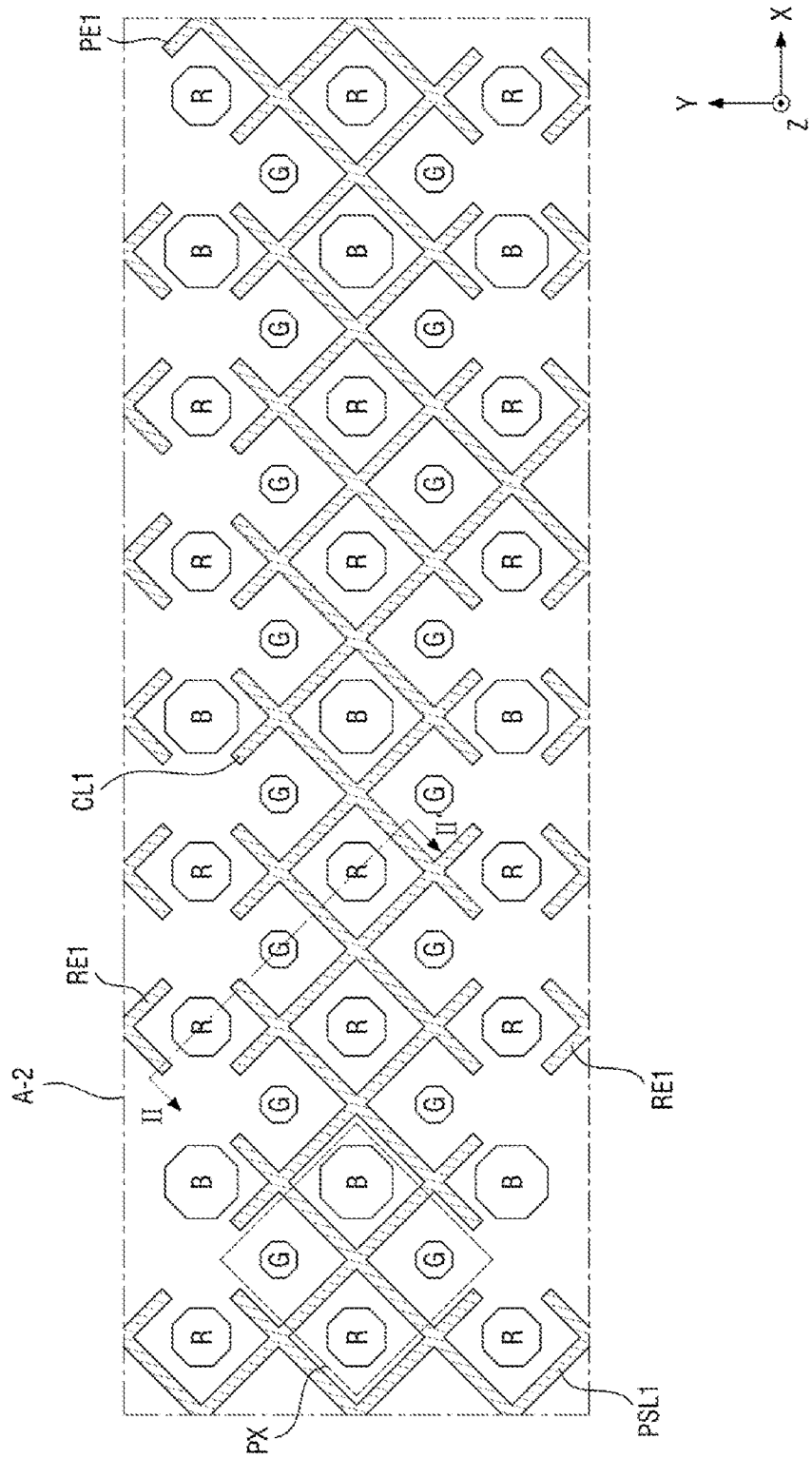
FIG. 14 is an enlarged plan view illustrating the "A-2" area of FIG. 12.

FIG. 14 is an enlarged plan view illustrating an "A-2" area of FIG. 12.

Referring to FIG. 14, the first sensing electrode RE1, the first force sensor electrode PE1, the first pressures sensor line PSL1, and the first connecting line CL1 may be formed as mesh- or net-type electrodes. The first sensing electrode RE1, the first force sensor electrode PE1, the first pressures sensor line PSL1, and the first connecting line CL1 may be disposed apart from one another.

Subpixels (R, G, and B) may be disposed not to overlap with first touch electrodes TE and second touch electrodes RE. That is, the subpixels (R, G, and B) may be disposed in regions that are defined in the form of a matrix by the first sensing electrode RE1, the first force sensor electrode PE1, the first pressures sensor line PSL1, and the first connecting line CL1, which are formed as mesh- or net-type electrodes. The regions defined by the first sensing electrode RE1, the first force sensor electrode PE1, the first pressures sensor line PSL1, and the first connecting line CL1 may have a rhombus shape, but the present disclosure is not limited thereto. In some examples, the regions defined by the first sensing electrode RE1, the first force sensor electrode PE1, the first pressures sensor line PSL1, and the first connecting line CL1 may have a rectangular or square shape. In some examples, the regions defined by the first sensing electrode RE1, the first force sensor electrode PE1, the first pressures sensor line PSL1, and the first connecting line CL1 may have another polygonal shape.

The subpixels (R, G, and B) may include first subpixels R for emitting light of a first color, second subpixels G for emitting light of a second color, and third subpixels B for emitting light of a third color. The first subpixels R, the second subpixels G, and the third subpixels B may be red subpixels, green subpixels, and blue subpixels, respectively, but the present disclosure is not limited thereto. One first subpixel R, two second subpixels G, and one third subpixel B may be defined as a single pixel PX, which is a group of subpixels capable of displaying white gradation.

FIG. 14 illustrates that the first subpixels R, the second subpixels G, and the third subpixels B have an octagonal shape in a plan view, but the present disclosure is not limited thereto. In some examples, the first subpixels R, the second subpixels G, and the third subpixels B may have another polygonal shape or a circular or elliptical shape in a plan view. Also, FIG. 14 illustrates that the third subpixels B have a largest size and the second subpixels G have a smallest size, but the present disclosure is not limited thereto.

Figure 15:
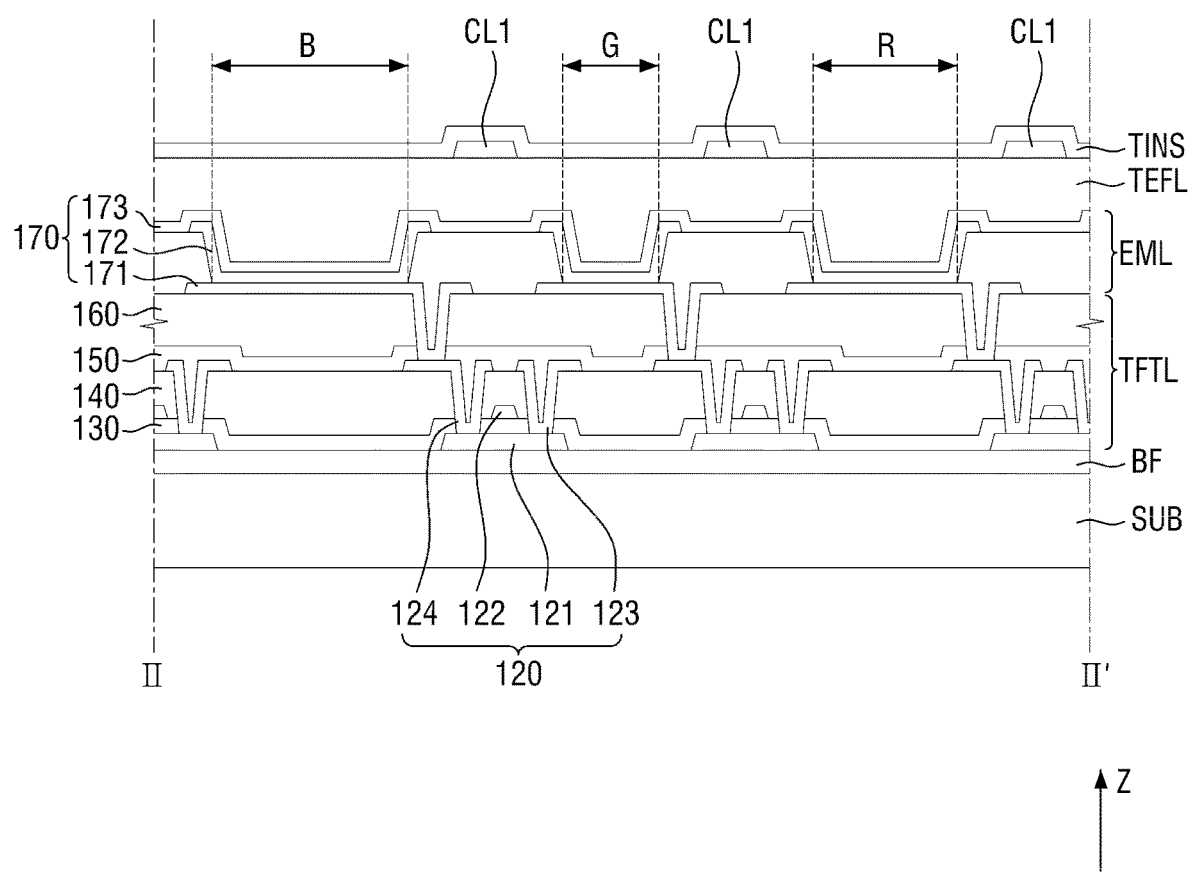
FIG. 15 is a cross-sectional view taken along the line II-II' of FIG. 12.

FIG. 15 is a cross-sectional view taken along the line II-II' of FIG. 12.

Referring to FIG. 15, the TFT layer TFTL is formed on the substrate SUB. The TFT layer TFTL includes TFTs 120, a gate insulating film 130, an interlayer insulating film 140, a passivation film 150, and a planarization film 160.

A buffer film BF may be formed on the substrate SUB. The buffer film BF may be formed on the substrate SUB to protect the TFTs 120 and organic light-emitting layers 172 of the light-emitting element layer EML against moisture that may penetrate the TFTs 120 and the organic light-emitting layers 172 via the substrate SUB. The buffer film BF may include a plurality of inorganic films that are alternately stacked. For example, the buffer film BF may be formed as a multilayer film in which at least one of a silicon nitride layer, a silicon oxynitride layer, a silicon oxide layer, a titanium oxide layer, and an aluminum oxide layer is alternately stacked. The buffer film BF may not be provided.

The TFTs 120 are formed on the buffer film BF. The TFTs 120 include active layers 121, gate electrodes 122, source electrodes 123, and drain electrodes 124. FIG. 8B illustrates an example in which the TFTs 120 are top gate TFTs in which the gate electrodes 122 are disposed above the active layers 121, but the present disclosure is not limited thereto. That is, in another example, the TFTs 120 may be bottom gate TFTs in which the gate electrodes 122 are disposed below the active layers 121 or may be double gate TFTs in which the gate electrodes 122 are disposed above and below the active layers 121.

The active layers 121 are formed on the buffer film BF. The active layers 121 may include polycrystalline silicon, monocrystalline silicon, low-temperature polycrystalline silicon, amorphous silicon, or an oxide semiconductor. For example, the oxide semiconductor may include a binary compound (ABx), a ternary compound (ABxCy), or a quaternary compound (ABxCyDz) comprising indium (In), zinc (Zn), gallium (Ga), tin (Sn), titanium (Ti), aluminum (Al), hafnium (Hf), zirconium (Zr), or magnesium (Mg). For example, the active layer 121 may include indium tin zinc oxide (ITZO) or indium gallium zinc oxide (IGZO). A light-shielding layer for blocking external light incident upon the active layers 121 may be formed between the buffer film BF and the active layers 121.

The gate insulating film 130 may be formed on the active layers 121. The gate insulating film 130 may be formed as an inorganic film, for example, a silicon nitride layer, a silicon oxynitride layer, a silicon oxide layer, a titanium oxide layer, or an aluminum oxide layer.

The gate electrodes 122 and gate lines may be formed on the gate insulating film 130. The gate electrodes 122 and the gate lines may be formed as single- or multilayer films including at least one of molybdenum (Mo), Al, chromium (Cr), gold (Au), Ti, nickel (Ni), neodymium (Nd), and copper (Cu) or an alloy thereof.

The bridge lines BL of FIG. 7, which connect the touch fan-out lines TFL, may be disposed on the gate insulating film 130. That is, the bridge lines BL may be disposed on the same layer as the gate electrodes 122 and the gate lines.

The interlayer insulating film 140 may be formed on the gate electrodes 122 and the gate lines. The interlayer insulating film 140 may be formed as an inorganic film, for example, a silicon nitride layer, a silicon oxynitride layer, a silicon oxide layer, a titanium oxide layer, or an aluminum oxide layer.

The source electrodes 123 and the drain electrodes 124 may be formed on the interlayer insulating film 140. The source electrodes 123 and the drain electrodes 124 may be connected to the active layers 121 via contact holes that penetrate the gate insulating film 130 and the interlayer insulating film 140. The source electrodes 123 and the drain electrodes 124 may be formed as single- or multilayer films including at least one of Mo, Al, Cr, Au, Ti, Ni, Nd, and Cu or an alloy thereof.

The touch fan-out lines TFL of FIG. 7 may be disposed on the interlayer insulating film 140. That is, the touch fan-out lines TFL of FIG. 7 may be disposed on the same layer as the source electrodes 123 and the drain electrodes 124.

The passivation film 150 may be formed on the source electrodes 123 and the drain electrodes 124 to insulate the TFTs 120. The passivation film 150 may be formed as an inorganic film, for example, a silicon nitride layer, a silicon oxynitride layer, a silicon oxide layer, a titanium oxide layer, or an aluminum oxide layer.

The planarization film 160 may be formed on the passivation film 150 to planarize height differences formed by the TFTs 120. The planarization film 160 may be formed as an organic film including an acrylic resin, an epoxy resin, a phenolic resin, a polyamide resin, a PI resin, and/or the like.

The light-emitting element layer EML is formed on the TFT layer TFTL. The light-emitting element layer EML includes light-emitting elements 170 and a pixel defining film 180.

The light-emitting elements 170 and the pixel defining film 180 are formed on the planarization film 160. The light-emitting elements 170 may include a first electrodes 171, organic light-emitting layers 172, and a second electrode 173.

The first electrode 171 may be formed on the planarization film 160. The first electrodes 171 may be connected to the source electrodes 123 of the TFTs 120 via contact holes that penetrate the passivation film 150 and the planarization film 160.

In a case where the light-emitting elements 170 have a top emission structure and emit light in a direction from the organic light-emitting layers 172 to the second electrode 173, the first electrodes 171 may be formed of a metallic material with high reflectance such as a stack of Al and Ti (e.g., Ti/Al/Ti), a stack of Al and indium tin oxide (ITO) (e.g., ITO/Al/ITO), a silver (Ag)-palladium (Pd)—Cu (APC) alloy, or a stack of an APC alloy and ITO (e.g., ITO/APC/ITO).

In a case where the light-emitting elements 170 have a bottom emission structure and emit light in a direction from the organic light-emitting layers 172 to the first electrodes 171, the first electrodes 171 may be formed of a transparent metallic material capable of transmitting light therethrough, such as ITO or indium zinc oxide (IZO), or a semi-transmissive metallic material such as the alloy of Mg and Ag. When the first electrodes 171 are formed of a semi-transmissive metallic material, the emission efficiency of the light-emitting elements 170 may be improved due to micro-cavities.

The pixel defining film 180 may be formed to define the first electrodes 171 on a planarization film 250 and thus to define the subpixels (R, G, and B). The pixel defining film 180 may be formed to cover the edges of each of the first electrodes 171. The pixel defining film 180 may be formed as an organic film including an acrylic resin, an epoxy resin, a phenolic resin, a polyamide resin, or a PI resin.

The subpixels (R, G, and B) are regions in which the first electrodes 171, the organic light-emitting layers 172, and the second electrode 173 are sequentially stacked so that holes from the first electrodes 171 and electrons from the second electrode 173 can combine in the organic light-emitting layers 172 and can thus emit light.

The organic light-emitting layers 172 are formed on the first electrodes 171 and on the pixel defining film 180. The organic light-emitting layers 172 may include an organic material and may thus emit light of a set or predetermined color. For example, each of the organic light-emitting layers 172 may include a hole transport layer, an organic material layer, and an electron transport layer. In this example, the organic light-emitting layers 172 of the red subpixels R may emit red light, the organic light-emitting layers 172 of the green subpixels G may emit green light, and the organic light-emitting layers 172 of the blue subpixels B may emit blue light. In another example, the organic light-emitting layers 172 of the subpixels (R, G, and B) may emit white light. In this example, the red subpixels R may further include red color filter layers, the green subpixels G may further include green color filter layers, and the blue subpixels B may further include blue color filter layers.

The second electrode 173 is formed on the organic light-emitting layers 172. The second electrode 173 may be formed to cover the organic light-emitting layers 172. The second electrode 173 may be a common layer formed in common for all the pixels P. A capping layer may be formed on the second electrode 173.

In a case where the light-emitting elements 170 have a top emission structure, the second electrode 173 may be formed of a transparent metallic material capable of transmitting light therethrough, such as ITO or IZO, or a semi-transmissive metallic material such as the alloy of Mg and Ag. When the second electrode 173 is formed of a semi-transmissive metallic material, the emission efficiency of the light-emitting elements 170 may be improved due to micro-cavities.

In a case where the light-emitting elements 170 have a bottom emission structure, the second electrode 173 may be formed of a metallic material with high reflectance such as a stack of Al and Ti (e.g., Ti/Al/Ti), a stack of Al and ITO (e.g., ITO/Al/ITO), an APC alloy, or a stack of an APC alloy and ITO (e.g., ITO/APC/ITO).

The thin-film encapsulation layer TFEL is formed on the light-emitting element layer EML. The thin-film encapsulation layer TFEL is disposed on the second electrode 173. The thin-film encapsulation layer TFEL may include at least one inorganic film to prevent or substantially prevent the infiltration of oxygen or moisture into the organic light-emitting layers 172 and the second electrode 173. Also, the thin-film encapsulation layer TFEL may include at least one organic film to protect the light-emitting element layer EML against foreign materials such as dust. For example, the thin-film encapsulation layer TFEL may include a first inorganic film disposed on the second electrode 173, an organic film disposed on the first inorganic film, and a second inorganic film disposed on the organic film. The first and second inorganic films may be formed as silicon nitride layers, silicon oxynitride layers, silicon oxide layers, titanium oxide layers, or aluminum oxide layers, but the present disclosure is not limited thereto. The organic film may be formed of an acrylic resin, an epoxy resin, a phenolic resin, a polyamide resin, a PI resin, and/or the like.

The touch sensor layer TSL is formed on the thin-film encapsulation layer TFEL. The touch sensor layer TSL may include the driving electrodes, the sensing electrodes, the force sensor electrodes, the sub-driving lines, the sensing lines, the force sensor lines, the dummy patterns, and the ground lines illustrated in FIG. 8A. The driving electrodes, the sensing electrodes, the force sensor electrodes, the sub-driving lines, the sensing lines, the force sensor lines, the dummy patterns, and the ground lines of the touch sensor layer TSL may be disposed on the same layer on the thin-film encapsulation layer TFEL. The driving electrodes, the sensing electrodes, the force sensor electrodes, the sub-driving lines, the sensing lines, the force sensor lines, the dummy patterns, and the ground lines of the touch sensor layer TSL may be formed of a stack of Al and Ti (e.g., Ti/Al/Ti), a stack of Al and ITO (e.g., ITO/Al/ITO), an APC alloy, or a stack of an APC alloy and ITO (e.g., ITO/APC/ITO), but the present disclosure is not limited thereto.

The driving electrodes, the sensing electrodes, the force sensor electrodes, the sub-driving lines, the sensing lines, the force sensor lines, the dummy patterns, and the ground lines of the touch sensor layer TSL are formed as mesh or net-type electrodes and thus do not overlap with the subpixels (R, G, and B). Thus, the subpixels (R, G, and B) can be prevented from being hidden by the driving electrodes, the sensing electrodes, the force sensor electrodes, the sub-driving lines, the sensing lines, the force sensor lines, the dummy patterns, and the ground lines of the touch sensor layer TSL.

For example, the first connecting lines CL1 are illustrated in FIG. 15 as being disposed on the thin-film encapsulation layer TFEL. The first connecting lines CL1 may not overlap with the subpixels (ft G, and B), but may overlap with the pixel defining film 180.

According to the embodiment of FIG. 15, since the touch sensor layer TSL is formed directly on the thin-film encapsulation layer TFEL, the thickness of the display device 10 can be reduced as compared to a case where a separate touch panel is attached on the thin-film encapsulation layer TFEL.

Also, according to the embodiment of FIG. 15, the driving electrodes, the sensing electrodes, the force sensor electrodes, the sub-driving lines, the sensing lines, the force sensor lines, the dummy patterns, and the ground lines of the touch sensor layer TSL are not only formed as mesh-type electrodes, but also disposed to overlap with the pixel defining film 180. As a result, the aperture areas of the subpixels (ft G, and B) can be prevented or substantially prevented from decreasing, and the parasitic capacitance between the driving electrodes of the touch sensor layer TSL and the second electrode 173 and between the sensing electrodes of the touch sensor layer TSL and the second electrode 173 can be reduced.

Figure 16:
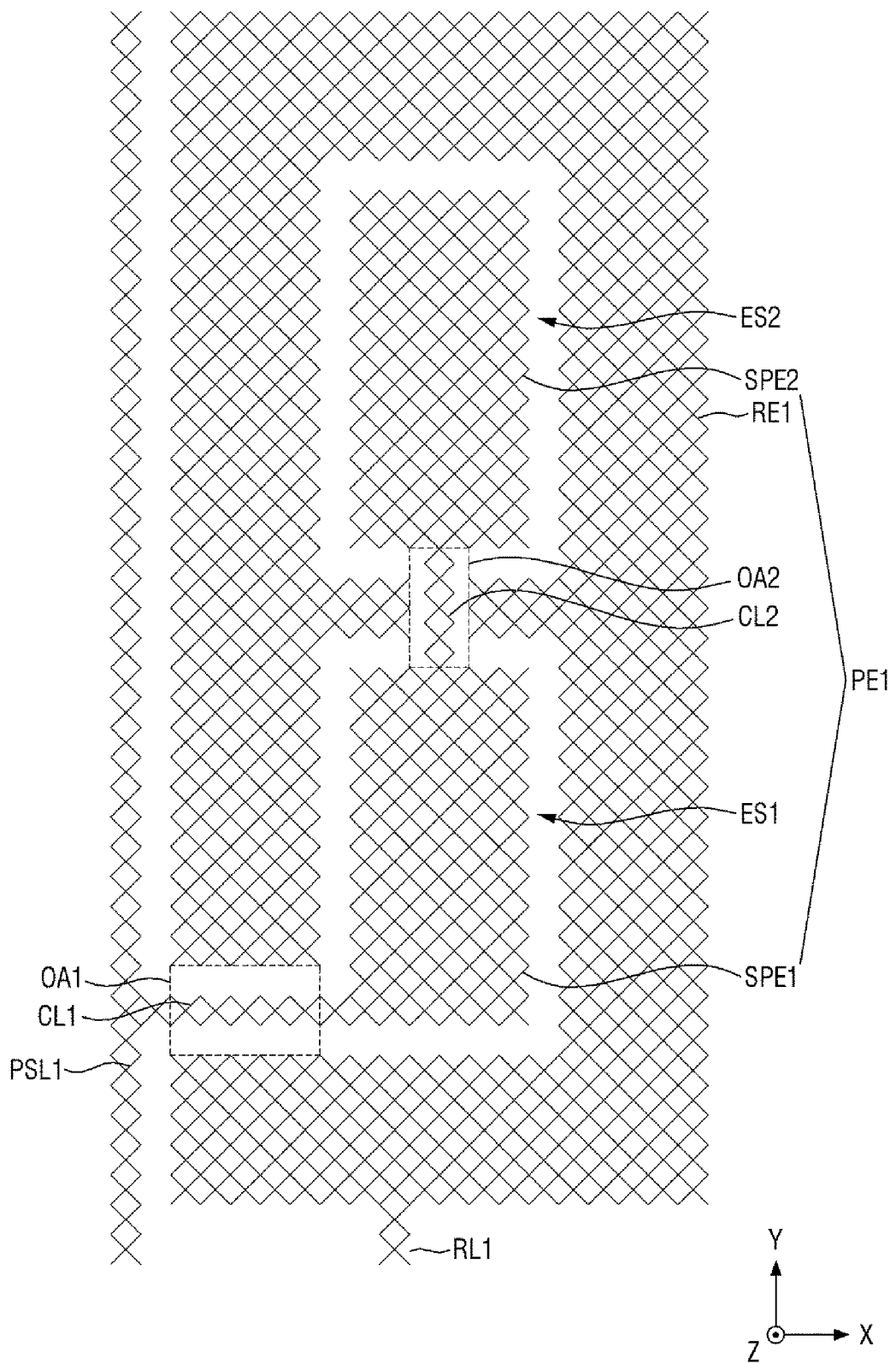
FIG. 16 is an enlarged plan view illustrating the first sensing electrode and first and second sub force sensor electrode of FIG. 8A.

FIG. 16 is an enlarged plan view illustrating a first sensing electrode and first and second sub force sensor electrode of FIG. 8A.

The embodiment of FIG. 16 differs from the embodiment of FIG. 12 in that a first force sensor electrode PE1 includes a plurality of sub force sensor electrodes, that is, the first sub force sensor electrode SPE1 and a second sub force sensor electrode SPE2.

Referring to FIG. 16, the first sensing electrode RE1, the first sub force sensor electrode SPE1, the second sub force sensor electrode SPE2, the first sensing line RL1, the first connecting line CL1, and the first force sensor line PSL1 may be formed as mesh- or net-type electrodes. Thus, the first sensing electrode RE1, the first sub force sensor electrode SPE1, the second sub force sensor electrode SPE2, the first sensing line RL1, the first connecting line CL1, and the first force sensor line PSL1 may not overlap with the subpixels P. Accordingly, the subpixels P can be prevented from being hidden by the first sensing electrode RE1, the first sub force sensor electrode SPE1, the second sub force sensor electrode SPE2, the first sensing line RL1, the first connecting line CL1, and the first force sensor line PSL1.

The first sensing electrode RE1, the first sub force sensor electrode SPE1, the second sub force sensor electrode SPE2, the first sensing line RL1, the first connecting line CL1, and the first force sensor line PSL1 may be disposed on the same layer. Since the first sensing electrode RE1, the first sub force sensor electrode SPE1, the second sub force sensor electrode SPE2, the first sensing line RL1, the first connecting line CL1, and the first force sensor line PSL1 are apart from one another, the first sensing electrode RE1, the first sub force sensor electrode SPE1, the second sub force sensor electrode SPE2, the first sensing line RL1, the first connecting line CL1, and the first force sensor line PSL1 can be electrically isolated from one another. Due to the presence of the first and second sub force sensor electrodes SPE1 and SPE2, the overlapping area of the first sensing electrode RE1 and the second electrode 173 in the display area DA can be reduced, and as a result, the parasitic capacitance of the first sensing electrode RE1 can be lowered.

The first sensing electrode RE1 may include a plurality of empty spaces ES formed in the middle thereof. For example, as illustrated in FIG. 16, the first sensing electrode RE1 may include first and second empty spaces ES1 and ES2 in the middle thereof. The first sub force sensor electrode SPE1 may be disposed in the first empty space ES1 of the first sensing electrode RE1, and the second sub force sensor electrode SPE2 may be disposed in the second empty space ES2 of the first sensing electrode RE1. The first sensing electrode RE1 may be disposed to surround the first and second sub force sensor electrodes SPE1 and SPE2. The first and second sub force sensor electrodes SPE1 and SPE2 may be formed to have a rectangular shape in a plan view, but the planar shape of the first and second sub force sensor electrodes SPE1 and SPE2 is not particularly limited.

The first sensing electrode RE1 may include a first open area OA1 which allows the first sub force sensor electrode SPE1 in the first empty space ES1 of the first sensing electrode RE1 to be connected to the first force sensor line PSL1 on the outside of the first sensing electrode RE1. In the first open area OA1, the first connecting line CL1, which is connected to the first sub force sensor electrode SPE1 and the first force sensor line PSL1, may be disposed. One end of the first connecting line CL1 may be connected to the first sub force sensor electrode SPE1, and the other end of the first connecting line CL1 may be connected to the first force sensor line PSL1.

The first sensing electrode RE1 may include a second open area OA2 which allows the second sub force sensor electrode SPE2 in the second empty space ES2 of the first sensing electrode RE1 to be connected to the first sub force sensor electrode SPE1 in the first empty space ES1 of the first sensing electrode RE1. The first and second empty spaces ES1 and ES2 may be connected by the second open area OA2. In the second open area OA2, a second connecting line CL2, which is connected to the first and second sub force sensor electrodes SPE1 and SPE2, may be disposed. One end of the second connecting line CL2 may be connected to the first sub force sensor electrode SPE1, and the other end of the second connecting line CL2 may be connected to the second sub force sensor electrode SPE2.

FIG. 16 illustrates that the first sensing electrode RE1 includes two empty spaces, but the present disclosure is not limited thereto. In some examples, the first sensing electrode RE1 may include three or more empty spaces, in which case, a force sensor electrode may be disposed in each of the three or more empty spaces.

The connections between the force sensor electrodes disposed in the other sensing electrodes and the first through third force sensor lines PSL1 through PSL3 may be substantially the same as that described above with reference to FIG. 16.

According to the embodiment of FIG. 16, the touch sensing unit TDU includes a plurality of sub force sensor electrodes SPE1 and SPE2 that are disposed apart from sensing electrodes and can thus be electrically isolated from the sensing electrodes. Therefore, the touch sensing unit TDU can detect not only touch input, but also pressure input, from the user.

Figure 17:
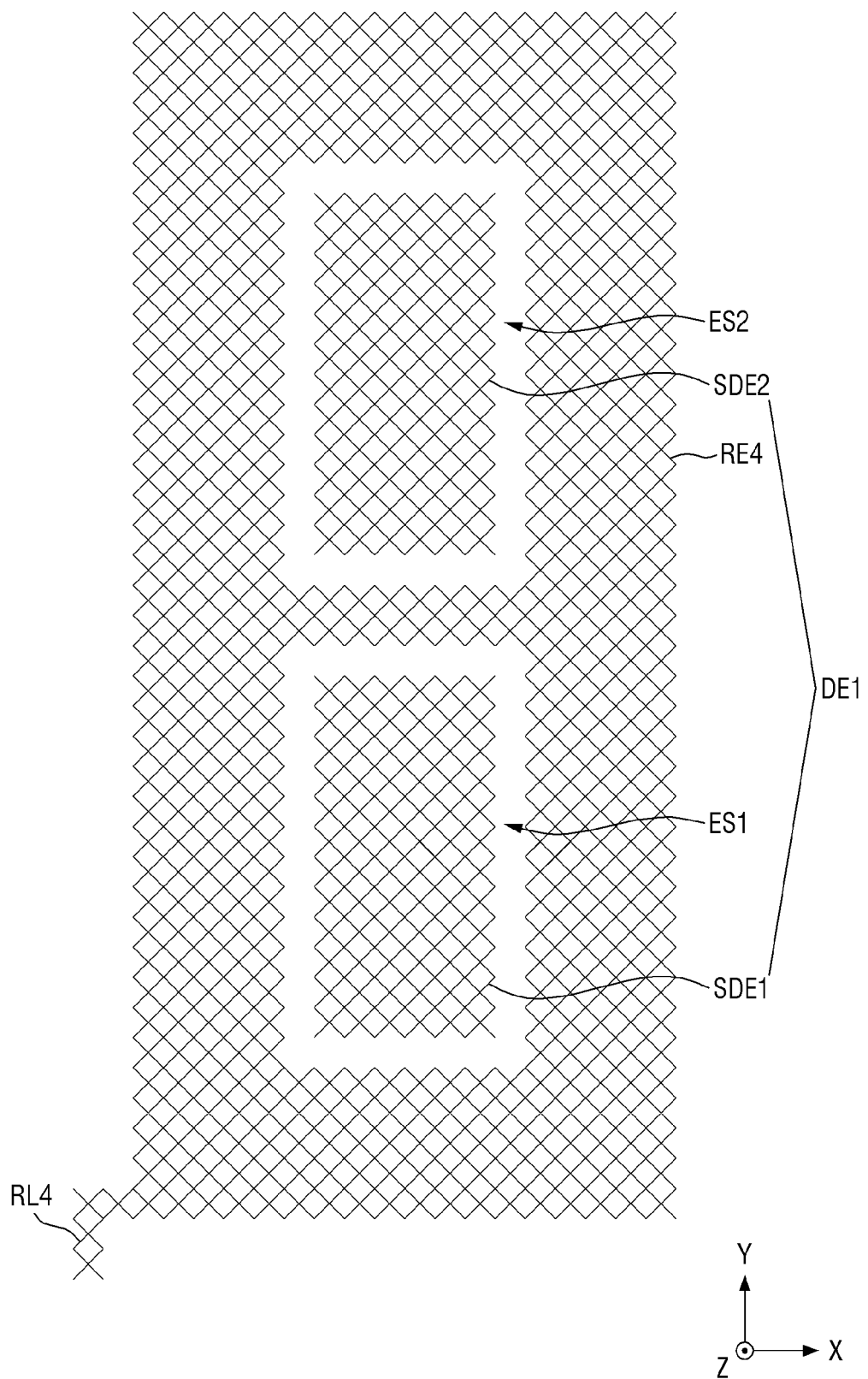
FIG. 17 is an enlarged plan view illustrating the fourth sensing electrode and first and second dummy sub electrodes of FIG. 8B.

FIG. 17 is an enlarged plan view illustrating a fourth sensing electrode and first and second sub dummy electrodes of FIG. 8B.

The embodiment of FIG. 17 differs from the embodiment of FIG. 13 in that a first dummy electrode includes a plurality of dummy electrodes, that is, the first sub dummy electrode SDE1 and a second sub dummy electrode SDE2, which are disposed in the fourth sensing electrode RE4.

Referring to FIG. 17, the fourth sensing electrode RE4, the first sub dummy electrode DSE1, the second sub dummy electrode DSE2, and the fourth sensing line RL4 may be formed as mesh- or net-type electrodes. Thus, the fourth sensing electrode RE4, the first sub dummy electrode DSE1, the second sub dummy electrode DSE2, and the fourth sensing line RL4 may not overlap with the subpixels P. Accordingly, the subpixels P can be prevented from being hidden by the fourth sensing electrode RE4, the first sub dummy electrode DSE1, the second sub dummy electrode DSE2, and the fourth sensing line RL4.

The fourth sensing electrode RE4, the first sub dummy electrode DSE1, the second sub dummy electrode DSE2, and the fourth sensing line RL4 may be disposed on the same layer. Since the fourth sensing electrode RE4, the first sub dummy electrode DSE1, the second sub dummy electrode DSE2, and the fourth sensing line RL4 are apart from one another, the fourth sensing electrode RE4, the first sub dummy electrode DSE1, the second sub dummy electrode DSE2, and the fourth sensing line RL4 can be electrically isolated from one another. Due to the presence of the first and second sub dummy electrodes DSE1 and DSE2, the overlapping area of the fourth sensing electrode RE4 and the second electrode 173 in the display area DA can be reduced, and as a result, the parasitic capacitance of the fourth sensing electrode RE4 can be lowered.

The fourth sensing electrode RE4 may include a plurality of empty spaces formed in the middle thereof. For example, as illustrated in FIG. 17, the fourth sensing electrode RE4 may include first and second empty spaces ES1 and ES2 in the middle thereof. The first dummy electrode DE1 may be disposed in the first empty space ES1 of the fourth sensing electrode RE4, and the second sub dummy electrode DSE2 may be disposed in the second empty space ES2 of the fourth sensing electrode RE4. The fourth sensing electrode RE4 may be disposed to surround the first and second sub dummy electrodes DSE1 and DSE2. The first and second sub dummy electrodes DSE1 and DSE2 may be formed to have a rectangular shape in a plan view, but the planar shape of the first and second sub dummy electrodes DSE1 and DSE2 is not particularly limited.

FIG. 17 illustrates that the fourth sensing electrode RE4 includes two empty spaces, but the present disclosure is not limited thereto. In some examples, the fourth sensing electrode RE4 may include three or more empty spaces, in which case, a dummy electrode may be disposed in each of the three or more empty spaces.

The structure of the other sensing electrodes and the structure of the dummy electrodes formed in each of the other sensing electrodes may be substantially the same as those described above with reference to FIG. 17.

Figure 18:
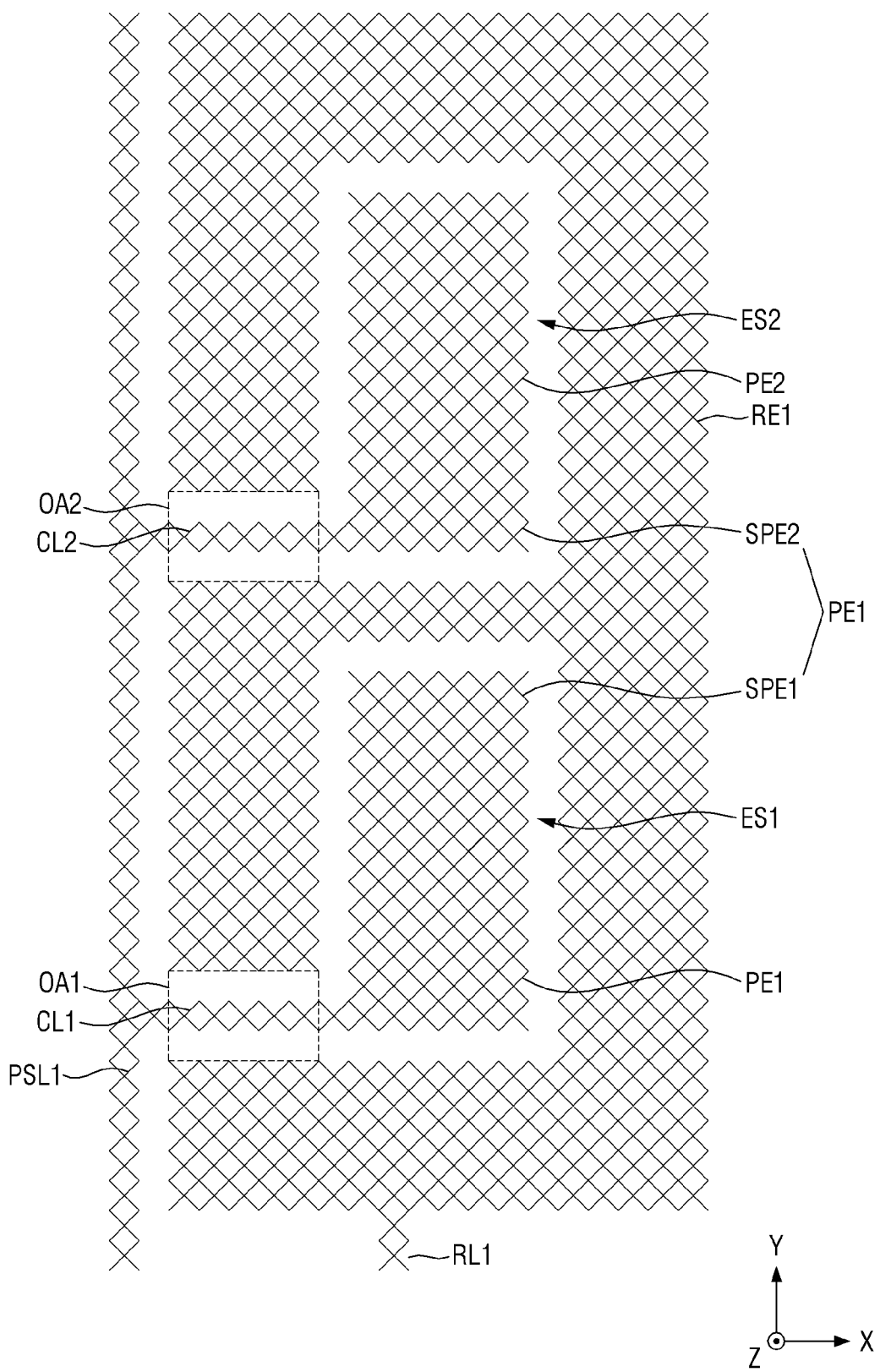
FIG. 18 is an enlarged plan view illustrating the first sensing electrode and first and second sub force sensor electrode of FIG. 8A.

FIG. 18 is an enlarged plan view illustrating a first sensing electrode and first and second sub force sensor electrode of FIG. 8A.

The embodiment of FIG. 18 differs from the embodiment of FIG. 16 in that the second sub force sensor electrode SPE2 in the second empty space ES2 of the first sensing electrode RE1 is connected to the first force sensor line PSL1 via the second connecting line CL2.

Referring to FIG. 18, the first sensing electrode RE1 may include the open area OA2, which allows the second sub force sensor electrode SPE2 in the second empty space ES2 of the first sensing electrode RE1 to be connected to the first force sensor line PSL1. The first and second empty spaces ES1 and ES2 of the first sensing electrode RE1 may not be connected. In the second open area OA2, the second connecting line CL2, which is connected to the second sub force sensor electrode SPE2 and the first force sensor line PSL1, may be disposed. One end of the second connecting line CL2 may be connected to the second sub force sensor electrode SPE2, and the other end of the second connecting line CL2 may be connected to the first force sensor line PSL1.

According to the embodiment of FIG. 18, the touch sensing unit TDU includes a plurality of sub force sensor electrodes SPE1 and SPE2 that are disposed apart from sensing electrodes and can thus be electrically isolated from the sensing electrodes. Therefore, the touch sensing unit TDU can detect not only touch input, but also pressure input, from the user.

Figure 19:
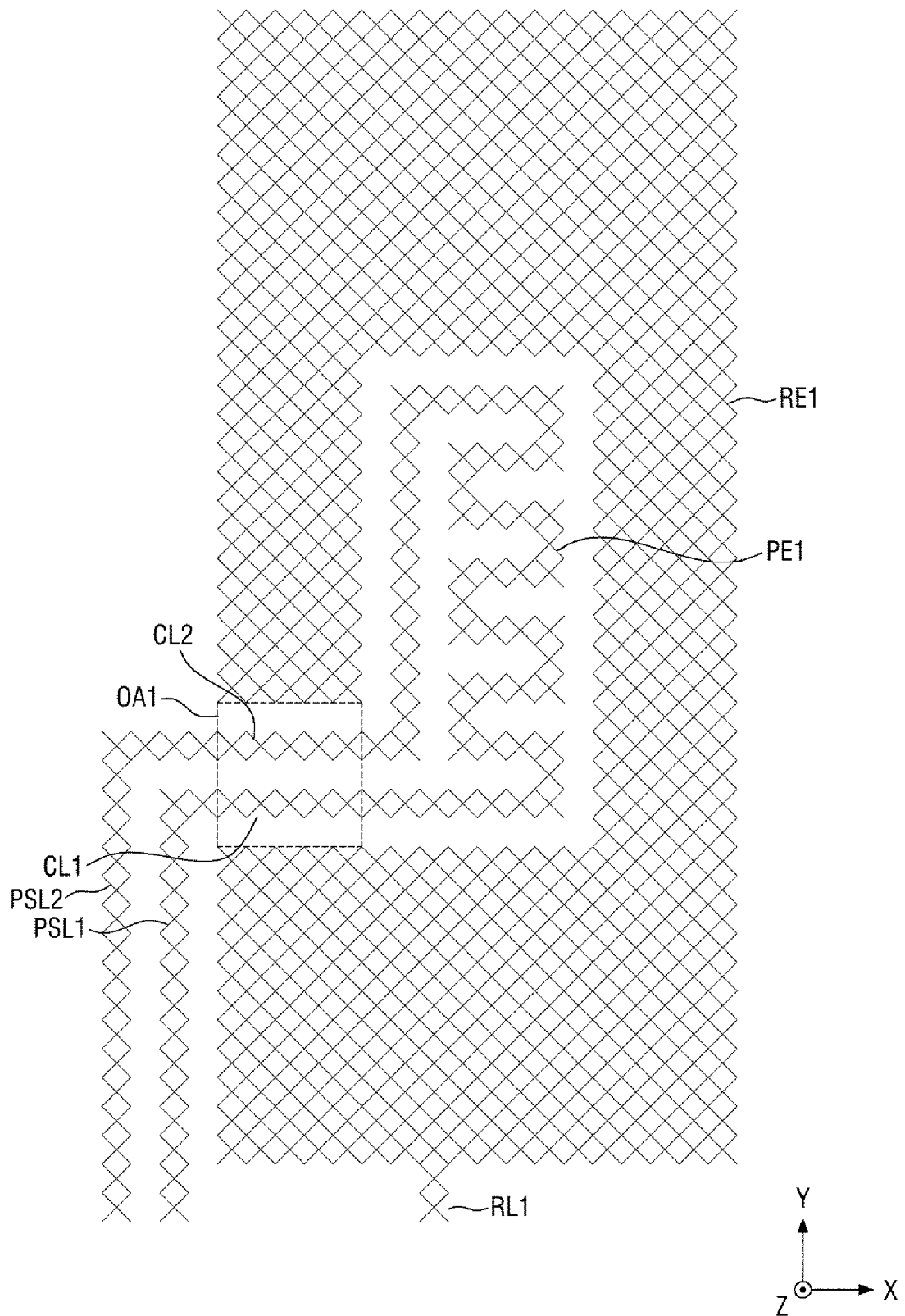
FIG. 19 is an enlarged plan view illustrating a first sensing electrode and the first force sensor electrode of FIG. 8A.

FIG. 19 is an enlarged plan view illustrating a first sensing electrode and a first force sensor electrode of FIG. 8A. For example, FIG. 19 illustrates the first sensing electrode RE1, the first force sensor electrode PE1, the first sensing line RL1, the first connecting line CL1, the second connecting line CL2, the first force sensor line PSL1, and the second force sensor line PSL2 of FIG. 8A.

Referring to FIG. 19, the first sensing electrode RE1, the first force sensor electrode PE1, the first sensing line RL1, the first connecting line CL1, the second connecting line CL2, the first force sensor line PSL1, and the second force sensor line PSL2 may be formed as mesh- or net-type electrodes. Thus, the first sensing electrode RE1, the first force sensor electrode PE1, the first sensing line RL1, the first connecting line CL1, the second connecting line CL2, the first force sensor line PSL1, and the second force sensor line PSL2 may not overlap with the subpixels P. Accordingly, the subpixels P can be prevented from being hidden by the first sensing electrode RE1, the first force sensor electrode PE1, the first sensing line RL1, the first connecting line CL1, the second connecting line CL2, the first force sensor line PSL1, and the second force sensor line PSL2.

The first sensing electrode RE1, the first force sensor electrode PE1, the first sensing line RL1, the first connecting line CL1, the second connecting line CL2, the first force sensor line PSL1, and the second force sensor line PSL2 may be disposed on the same layer. Since the first sensing electrode RE1, the first force sensor electrode PE1, the first sensing line RL1, the first connecting line CL1, the second connecting line CL2, the first force sensor line PSL1, and the second force sensor line PSL2 are apart from one another, the first sensing electrode RE1, the first force sensor electrode PE1, the first sensing line RL1, the first connecting line CL1, the second connecting line CL2, the first force sensor line PSL1, and the second force sensor line PSL2 can be electrically isolated from one another. Due to the presence of the first force sensor electrode PE1, the overlapping area of the first sensing electrode RE1 and the second electrode 173 in the display area DA can be reduced, and as a result, the parasitic capacitance of the first sensing electrode RE1 can be lowered.

The first sensing electrode RE1 may be formed as a rectangular frame. The first sensing electrode RE1 may include a single empty space ES formed in the middle thereof. In the empty space ES of the first sensing electrode RE1, a single first force sensor electrode PE1 may be disposed. The first sensing electrode RE1 may be disposed to surround the first force sensor electrode PE1. The first force sensor electrode PE1 may be formed in a serpentine shape including a plurality of bent portions in a plan view. In some examples, the first force sensor electrode PE1 may be formed in a spiral shape. Accordingly, the first force sensor electrode PE1 may serve as a resistance line, and in some examples, as a strain gauge.

The first sensing electrode RE1 may include the first open area OA1, which allows the first force sensor electrode PE1 in the empty space ES of the first sensing electrode RE1 to be connected to the first and second force sensor lines PSL1 and PSL2 on the outside of the first sensing electrode RE1.

In the first open area OA1, the first connecting line CL1, which is connected to the first force sensor electrode PE1 and the first force sensor line PSL1, may be disposed. One end of the first connecting line CL1 may be connected to a first end of the first force sensor electrode PE1, and the other end of the first connecting line CL1 may be connected to the first force sensor line PSL1.

Also, in the first open area OA2, the second connecting line CL2, which is connected to the first and second force sensor electrodes PE1 and PE2, may be disposed. One end of the second connecting line CL2 may be connected to a second end of the first force sensor electrode PE1, and the other end of the second connecting line CL2 may be connected to the second force sensor line PSL2.

The connections between the force sensor electrodes disposed in the other sensing electrodes and the first through third force sensor lines PSL1 through PSL3 may be substantially the same as that described above with reference to FIG. 19.

According to the embodiment of FIG. 19, the touch sensing unit TDU includes force sensor electrodes that are disposed apart from sensing electrodes and can thus be electrically isolated from the sensing electrodes. Therefore, the touch sensing unit TDU can detect not only touch input, but also pressure input, from the user.

Figure 20:
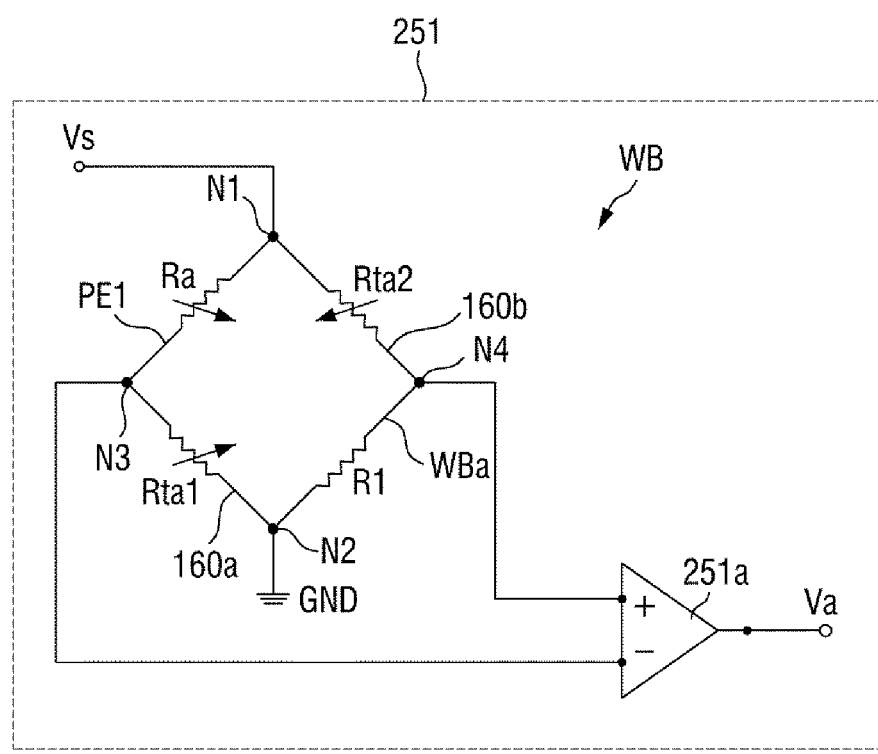
FIG. 20 illustrates how to detect pressure input using the first force sensor electrode of FIG. 19.

FIG. 20 illustrates how to detect pressure input using the first force sensor electrode of FIG. 19.

Referring to FIG. 20, the first force sensor electrode PE1 may include first and second ends which are on the opposite sides of the first force sensor electrode PE1. The first end of the first force sensor electrode PE1 may be connected to the first force sensor line PSL1, and the second end of the first force sensor electrode PE1 may be connected to the second force sensor line PSL2.

FIG. 20 illustrates that the first force sensor electrode PE1 serves as a strain gauge. In some examples, the first through ninth force sensor electrodes PE1 through PE9 may be connected by a single resistance line and may thus serve as a single strain gauge.

A pressure detection unit 521 may include a Wheatstone bridge circuit portion WB. The pressure detection unit 251 may further include an ADC and a processor for detecting a first voltage Va output from the Wheatstone bridge circuit portion WB.

The Wheatstone bridge circuit portion WB includes a first node N1, a second node N2, a first output node N3, and a second output node N4. A driving voltage Vs may be provided to the first node N1, and the second node N2 may be connected to a ground source GND.

The Wheatstone bridge circuit portion WB includes a first resistor WBa connected to the second node N2 and the second output node N4, a second resistor WBb connected to the first node N1 and the second output node N4, and a third resistor WBc connected to the second node N2 and the first output node N3.

Resistances R1, R2, and R3 of the first, second, and third resistors WBa, WBb, and WBc may have set or predetermined values. That is, the first, second, and third resistors WBa, WBb, and WBc may be fixed resistors.

The Wheatstone bridge circuit portion WB may further include a second amplifying circuit 251a such as an operational amplifier. The second amplifying circuit 251a may include an inverting input terminal, a non-inverting input terminal, and an output terminal. The second amplifier circuit 251a may detect an electrical flow between the first and second output nodes N3 and N4. That is, the second amplifying circuit 251a may operate as a galvanic element or a voltage measuring element.

One of the first and second output nodes N3 and N4 may be electrically connected to one input terminal of the second amplifying circuit 251a, and the other output node may be electrically connected to another input terminal of the second amplifying circuit 251a. For example, the first output node N3 may be connected to the inverting input terminal of the second amplifying circuit 251a, and the second output node N4 may be connected to the non-inverting input terminal of the second amplifying circuit 251a.

The output terminal of the second amplifying circuit 251a may output the first voltage Va, which is proportional to the difference between the voltages input to respective input terminals of the second amplifying circuit 251a.

The first end of the first force sensor electrode PE1 may be electrically connected to the first node N1 via a first signal line SL1, and the second end of the first force sensor electrode PE1 may be connected to the first output node N3 via a second signal line SL2.

The first force sensor electrode PE1, the first resistor WBa, the second resistor WBb, and the third resistor WBc may be connected to one another to form the Wheatstone bridge circuit portion WB.

When no pressure is applied, the product of a resistance Ra of the first force sensor electrode PE1 and the resistance R1 of the first resistor WBa may be substantially the same as the product of the resistance R2 of the second resistor WBb and the resistance R3 of the third resistor WBc.

When the product of the resistance Ra of the first force sensor electrode PE1 and the resistance R1 of the first resistor WBa is equal to the product of the resistance R2 of the second resistor WBb and the resistance R3 of the third resistor WBc, the voltage at the first output node N3 may be the same as the voltage at the second output node N4. When the voltages at the first and second output nodes N3 and N4 are the same, the difference in voltage between the first and second output nodes N3 and N4 is 0 V, and the first voltage Va output by the second amplifying circuit 251a may be 0 V.

In response to pressure being applied to the force sensing area PSA by the user, the first force sensor electrode PE1 may be deformed in accordance with the intensity of the pressure, and the resistance of the Ra of the first force sensor electrode PE1 may change accordingly. As a result, a voltage difference may be generated between the first and second output nodes N3 and N4. When a voltage difference is generated between the first and second output nodes N3 and N4, the second amplifying circuit 251a may output a non-zero voltage as the first voltage Va. Accordingly, touch pressure from the user can be detected based on the first voltage Va output by the second amplifying circuit 251a.

Figure 21:
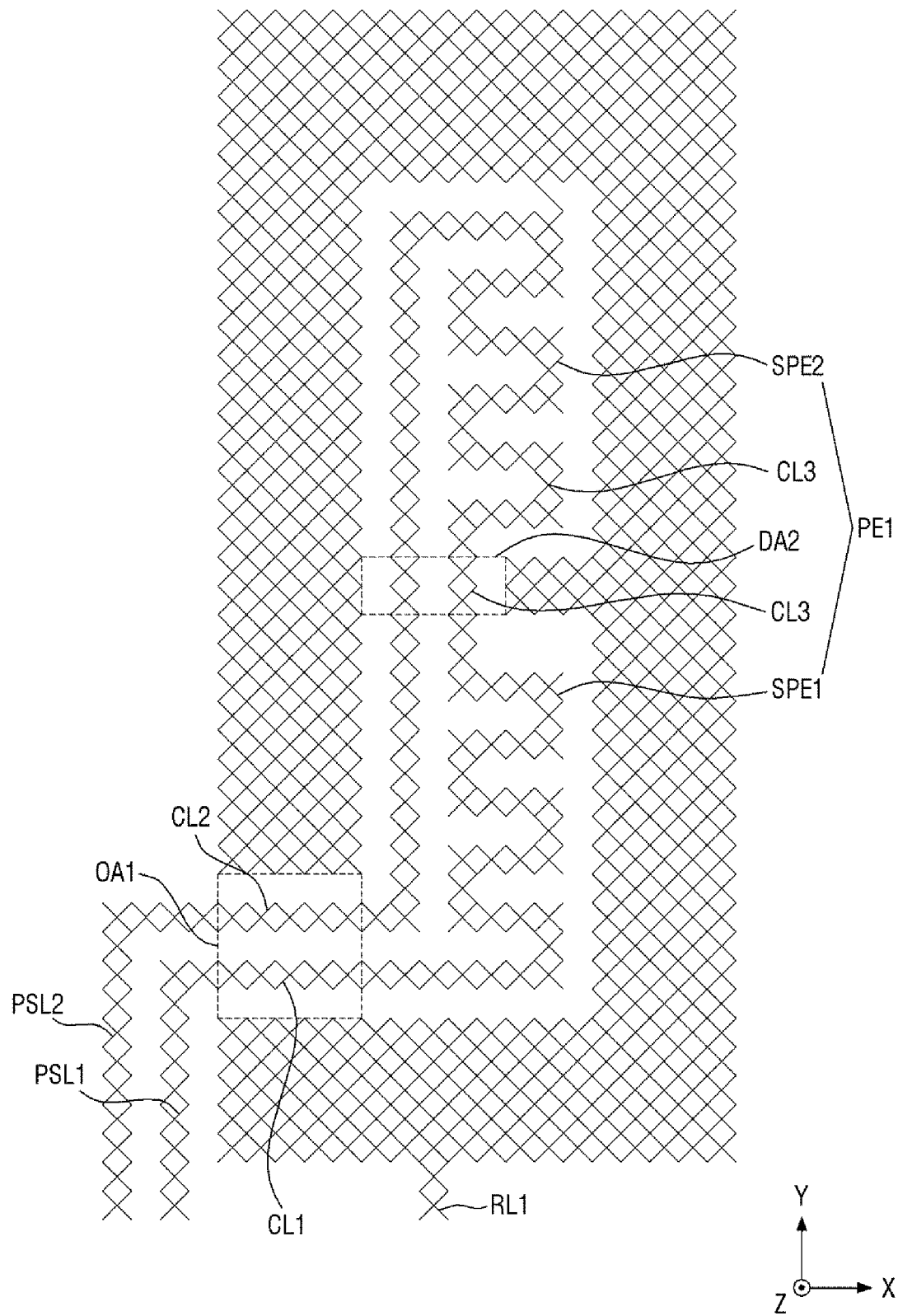
FIG. 21 is an enlarged plan view illustrating the first sensing electrode and the first force sensor electrode of FIG. 8A.

FIG. 21 is an enlarged plan view illustrating a first sensing electrode and a first force sensor electrode of FIG. 8A.

The embodiment of FIG. 21 differs from the embodiment of FIG. 19 in that a first force sensor electrode PE1 includes a plurality of force sensor electrodes, that is, the first and second sub force sensor electrodes SPE1 and SPE2, which are disposed within (e.g., surrounded by) the first sensing electrode RE1. For example, the first sensing electrode RE1 partially surrounds (or partially wraps around) the first force sensor electrode PE1 in a plan view.

Referring to FIG. 21, the first sensing electrode RE1, the first sub force sensor electrode SPE1, the second sub force sensor electrode SPE2, the first sensing line RL1, the first connecting line CL1, the second connecting line CL2, the third connecting line CL3, the first force sensor line PSL1, and the second force sensor line PSL2 may be formed as mesh- or net-type electrodes. Thus, the first sensing electrode RE1, the first sub force sensor electrode SPE1, the second sub force sensor electrode SPE2, the first sensing line RL1, the first connecting line CL1, the second connecting line CL2, the third connecting line CL3, the first force sensor line PSL1, and the second force sensor line PSL2 may not overlap with the subpixels P. Accordingly, the subpixels P can be prevented from being hidden by the first sensing electrode RE1, the first sub force sensor electrode SPE1, the second sub force sensor electrode SPE2, the first sensing line RL1, the first connecting line CL1, the second connecting line CL2, the third connecting line CL3, the first force sensor line PSL1, and the second force sensor line PSL2.

The first sensing electrode RE1, the first sub force sensor electrode SPE1, the second sub force sensor electrode SPE2, the first sensing line RL1, the first connecting line CL1, the second connecting line CL2, the third connecting line CL3, the first force sensor line PSL1, and the second force sensor line PSL2 may be disposed on the same layer. Since the first sensing electrode RE1, the first sub force sensor electrode SPE1, the second sub force sensor electrode SPE2, the first sensing line RL1, the first connecting line CL1, the second connecting line CL2, the third connecting line CL3, the first force sensor line PSL1, and the second force sensor line PSL2 are apart from one another, the first sensing electrode RE1, the first sub force sensor electrode SPE1, the second sub force sensor electrode SPE2, the first sensing line RL1, the first connecting line CL1, the second connecting line CL2, the third connecting line CL3, the first force sensor line PSL1, and the second force sensor line PSL2 can be electrically isolated from one another. Due to the presence of the first and second sub force sensor electrodes SPE1 and SPE2, the overlapping area of the first sensing electrode RE1 and the second electrode 173 in the display area DA can be reduced, and as a result, the parasitic capacitance of the first sensing electrode RE1 can be lowered.

The first sensing electrode RE1 may include a plurality of empty spaces ES formed in the middle thereof. For example, as illustrated in FIG. 21, the first sensing electrode RE1 may include first and second empty spaces ES1 and ES2 in the middle thereof. The first sub force sensor electrode SPE1 may be disposed in the first empty space ES1 of the first sensing electrode RE1, and the second sub force sensor electrode SPE2 may be disposed in the second empty space ES2 of the first sensing electrode RE1. The first sensing electrode RE1 may be disposed to surround the first and second sub force sensor electrodes SPE1 and SPE2. Each of the first and second sub force sensor electrodes SPE1 and SPE2 may be formed in a serpentine shape including a plurality of bent portions in a plan view. In some examples, each of the first and second sub force sensor electrodes SPE1 and SPE2 may be formed in a spiral shape. Accordingly, each of the first and second sub force sensor electrodes SPE1 and SPE2 may serve as a resistance line, and in some examples, as a strain gauge.

The first sensing electrode RE1 may include the first open area OA1, which allows the first and second sub force sensor electrodes SPE1 to be connected to the first and second force sensor lines PSL1 and PSL2 on the outside of the first sensing electrode RE1. Also, the first sensing electrode RE1 may include the second open area OA2, which is for connecting the first and second empty spaces ES1 and ES2 of the first sensing electrode RE1.

In the first open area OA1, the first connecting line CL1, which is connected to the first end of the first sub force sensor electrode SPE1 and the first force sensor line PSL1, may be disposed. One end of the first connecting line CL1 may be connected to the first end of the first sub force sensor electrode SPE1, and the other end of the first connecting line CL1 may be connected to the first force sensor line PSL1.

Also, in the first open area OA1, the second connecting line CL2, which is connected to a first end of the second sub force sensor electrode SPE2 and the second force sensor line PSL2, may be disposed. One end of the second connecting line CL2 may be connected to the first end of the second sub force sensor electrode SPE2, and the other end of the second connecting line CL2 may be connected to the second force sensor line PSL2.

In the second open area OA2, the third connecting line CL3, which is connected to the second end of the first sub force sensor electrode SPE1 and a second end of the second sub force sensor electrode SPE2, may be disposed. One end of the third connecting line CL3 may be connected to the second end of the first sub force sensor electrode SPE1, and the other end of the third connecting line CL3 may be connected to the second end of the second sub force sensor electrode SPE2.

The connections between the sub force sensor electrodes SPE1 and SPE2 disposed in the other sensing electrodes and the first through third force sensor lines PSL1 through PSL3 may be substantially the same as that described above with reference to FIG. 21.

According to the embodiment of FIG. 21, the touch sensing unit TDU includes sub force sensor electrodes SPE1 and SPE2 that are disposed apart from sensing electrodes and can thus be electrically isolated from the sensing electrodes. Therefore, the touch sensing unit TDU can detect not only touch input, but also pressure input, from the user.

Figure 22:
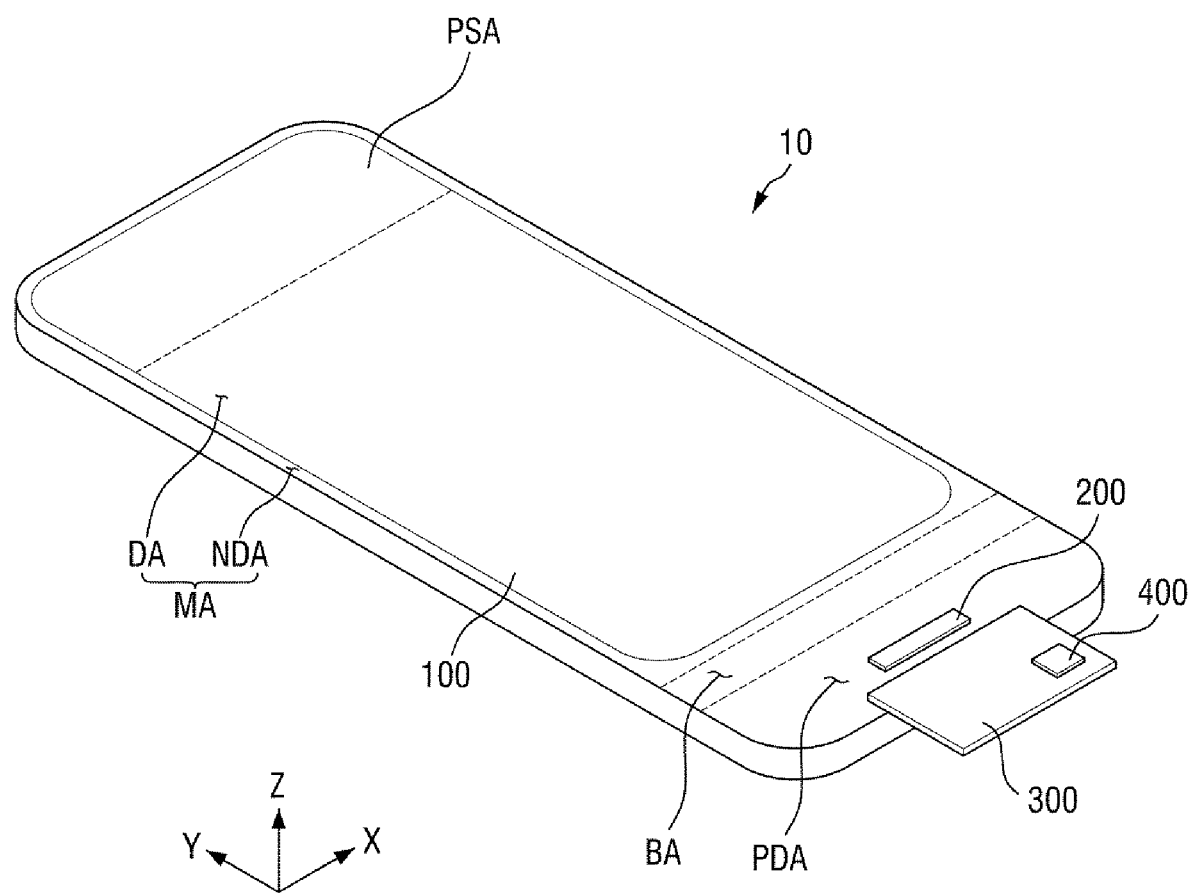
FIG. 22 is a perspective view of a display device according to an embodiment of the present disclosure.

FIG. 22 is a perspective view of a display device according to an embodiment of the present disclosure.

The embodiment of FIG. 22 differs from the embodiment of FIG. 1 in that a force sensing area PSA is disposed on an upper part of a display area DA of a display panel 100. The force sensing area PSA may be defined as an area including force sensor electrodes.

In a case where a display device 10 is applied to a smartphone, the display device 10 can be used as a proximity sensor for determining whether the top of the display panel 100 is being approached by a user during a call. That is, a determination can be made as to whether the top of the display panel 100 is being approached by the user during a call by measuring the self-capacitance of each of the force sensor electrodes in the force sensing area PSA or using the force sensor electrodes in the force sensing area PSA as strain gauges.

The force sensing area PSA may be provided on part of the display area DA of the display panel 100, as illustrated in FIGS. 1 and 22. In some examples, the force sensing area PSA may be provided on the entire display area DA of the display panel 100.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The display device and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the display device may be formed on one integrated circuit (IC) chip or on separate IC chips. Further, the various components of the display device may be implemented on a flexible printed circuit film, a tape carrier package (TCP), a printed circuit board (PCB), or formed on a same substrate. Further, the various components of the display device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Although the example embodiments of the present disclosure have been disclosed for illustrative purposes, those skilled in the art will appreciate that various modifications, additions and substitutions are possible, without departing from the scope and spirit of the disclosure as defined by the accompanying claims and equivalents thereof.

What is claimed is:

1. A touch sensor comprising:
   touch electrodes in a first area and a second area;
   a first force sensor electrode on a same layer as the touch electrodes and spaced from a first touch electrode in the first area;
   a second force sensor electrode on a same layer as the touch electrodes and spaced from a second touch electrode in the first area;
   a first force sensor line on a same layer as the touch electrodes and electrically connected to the first force sensor electrode and the second force sensor electrode, the first force sensor line being at a second side of the first touch electrode; and
   touch lines on a same layer as, and connected to, the touch electrodes, the touch lines comprising a first touch line connected to the first touch electrode and located at a first side of the first touch electrode,
   wherein the first force sensor line is located at a second side of the first touch electrode,
   wherein the first force sensor electrode and the second force sensor electrode are arranged in one direction, and
   wherein the first touch electrode and the second touch electrode are arranged in the one direction.

2. The touch sensor of claim 1, wherein the first touch electrode surrounds the first force sensor electrode.

3. The touch sensor of claim 2, further comprising: a first connecting line on a same layer as the touch electrodes, connecting the first force sensor line and the first force sensor electrode, and spaced from the first touch electrode.

4. The touch sensor of claim 1, wherein the first force sensor electrode comprises a first sub force sensor electrode and a second sub force sensor electrode on a same layer as the touch electrodes, electrically connected to the first force sensor line, and spaced from the first touch electrode.

5. The touch sensor of claim 4, wherein the first touch electrode surrounds the first and second sub force sensor electrodes.

6. The touch sensor of claim 5, further comprising:
   a first connecting line on a same layer as the touch electrodes, connecting the first force sensor line and the first sub force sensor electrode, and spaced from the first touch electrode.

7. The touch sensor of claim 6, further comprising:
   a second connecting line on a same layer as the touch electrodes, connecting the first force sensor electrode and the second sub force sensor electrode, and spaced from the first touch electrode.

8. The touch sensor of claim 4, further comprising:
   a second force sensor line on a same layer as the touch electrodes and electrically connected to the first force sensor electrode,
   wherein the first force sensor line is electrically connected to a first end of the first sub force sensor electrode, and
   wherein the second force sensor line electrically connected to a second end of the second sub force sensor electrode.

9. The touch sensor of claim 8, further comprising:
   a first connecting line on a same layer as the touch electrodes and connecting the first force sensor line and the first sub force sensor electrode; and
   a second connecting line on a same layer as the touch electrodes and connecting the second force sensor line and the second force sensor electrode.

10. The touch sensor of claim 9, wherein the first and second connecting lines are spaced from the first touch electrode.

11. The touch sensor of claim 1, further comprising:
a first connecting line on a same layer as the touch electrodes and connecting the first force sensor line and a first sub force sensor electrode;
a second connecting line on a same layer as the touch electrodes and connecting a second force sensor line and a second sub force sensor electrode; and
a third connecting line on a same layer as the touch electrodes and connecting the first and second sub force sensor electrodes.

12. The touch sensor of claim 11, wherein the first, second, and third connecting lines are spaced from the first touch electrode.

13. The touch sensor of claim 1, wherein the touch electrodes comprise driving electrodes and sensing electrodes, and
wherein the touch sensor further comprises a touch driving signal output part configured to apply touch driving signals to the driving electrodes and a touch sensing part configured to detect variations in mutual capacitance between the driving electrodes and the sensing electrodes.

14. The touch sensor of claim 1, further comprising:
a second force sensor electrode on a same layer as the touch electrodes and spaced from a second touch electrode in the first area.

15. The touch sensor of claim 14, wherein the second force sensor electrode is electrically connected to the first force sensor line.

16. The touch sensor of claim 14, wherein the touch lines further comprise a second touch line connected to the second touch electrode and on a first side of the second touch electrode, and
wherein the first force sensor line is on a second side of the second touch electrode.

17. The touch sensor of claim 1, further comprising:
a first dummy electrode on a same layer as the touch electrodes and spaced from a third touch electrode in the first area.

18. The touch sensor of claim 17, wherein the third touch electrode surrounds the first dummy electrode.

19. The touch sensor of claim 17, wherein the first dummy electrode is electrically floated.

20. The touch sensor of claim 1, further comprising:
a second dummy electrode on a same layer as the touch electrodes and spaced from a fourth touch electrode in the second area.

21. The touch sensor of claim 20, wherein the fourth touch electrode surrounds the second dummy electrode.

22. The touch sensor of claim 20, wherein the second dummy electrode is electrically floated.

23. The touch sensor of claim 1, further comprising:
a force driving signal output part configured to apply a force driving signal to the first force sensor electrode via the first force sensor line; and
a force sensing part configured to detect a variation in a self-capacitance of the first force sensor electrode via the first force sensor line.

24. The touch sensor of claim 19, further comprising:
a force sensing part electrically connected to the first force sensor line and a second force sensor line,
wherein the force sensing part comprises a first output node, a second output node, a first node to which a driving voltage is applied, and a second node which is connected to a ground source,
wherein the first force sensor line is electrically connected to the first node, and
wherein the second force sensor line is electrically connected to the first output node.

25. A display device comprising:
a substrate;
a display unit on the substrate and comprising a display area which comprises pixels; and
a touch sensor on the display unit and comprising a touch sensor area which overlaps with the display area, the touch sensor comprising:
touch electrodes in a first area and a second area of the touch sensor area;
a first force sensor electrode on a same layer as the touch electrodes and spaced from a first touch electrode in the first area; and
a second force sensor electrode on a same layer as the touch electrodes and spaced from a second touch electrode in the first area;
a first force sensor line on a same layer as the touch electrodes and electrically connected to the first force sensor electrode and the second force sensor electrode, the first force sensor line being at a second side of the first touch electrode; and
touch lines on a same layer as, and connected to, the touch electrodes, the touch lines comprising a first touch line connected to the first touch electrode and located at a first side of the first touch electrode,
wherein the first force sensor line is located at a second side of the first touch electrode,
wherein the first force sensor electrode and the second force sensor electrode are arranged in one direction, and
wherein the first touch electrode and the second touch electrode are arranged in the one direction.

* * * * *